United States Patent [19]

Biliskov, Jr. et al.

[11] Patent Number: 5,513,561
[45] Date of Patent: May 7, 1996

[54] GEAR TRAIN LOCKING MECHANISM FOR MECHANICAL POWER PRESSES

[75] Inventors: George J. Biliskov, Jr., Westmont; Ronald J. Votava, North Riverside, both of Ill.

[73] Assignee: Danly-Komatsu, L.P., Chicago, Ill.

[21] Appl. No.: 279,234

[22] Filed: Jul. 22, 1994

[51] Int. Cl.$^6$ .................................................. B30B 15/14
[52] U.S. Cl. ........................ 100/53; 72/2; 72/444; 72/449; 74/411.5; 100/282
[58] Field of Search ........................ 100/53, 282, 292; 74/411.5; 72/30, 444, 449, 452, 2

[56] References Cited

U.S. PATENT DOCUMENTS

| | | | |
|---|---|---|---|
| 2,259,882 | 10/1941 | Glasner | 72/444 |
| 3,704,757 | 12/1972 | Buress, III | 74/411.5 |
| 4,593,547 | 6/1986 | Heiberger | 72/1 |
| 5,048,410 | 9/1991 | Teramoto et al. | 100/53 |
| 5,157,983 | 10/1992 | Sankovic | 74/411.5 |
| 5,269,059 | 12/1993 | Rozenbojm | 100/53 |

FOREIGN PATENT DOCUMENTS

| | | | |
|---|---|---|---|
| 697007 | 1/1931 | France | 72/444 |
| 46-19668 | 6/1971 | Japan | 72/444 |

*Primary Examiner*—Stephen F. Gerrity
*Attorney, Agent, or Firm*—Leydig, Voit & Mayer, Ltd.

[57] ABSTRACT

A gear train locking mechanism for preventing the reciprocating slide of a mechanical power press from inadvertently moving during maintenance procedures and the like is disclosed. The gear train locking mechanism preferably includes an idler gear which is enmeshed with a drive gear of the power press and a movable arm assembly positioned for selectively engaging the idler gear to prevent its rotation. The engagement of the arm assembly and the idler gear effectively locks the gear train of the power press thereby preventing the slide of the power press from moving once the locking mechanism is activated.

19 Claims, 12 Drawing Sheets

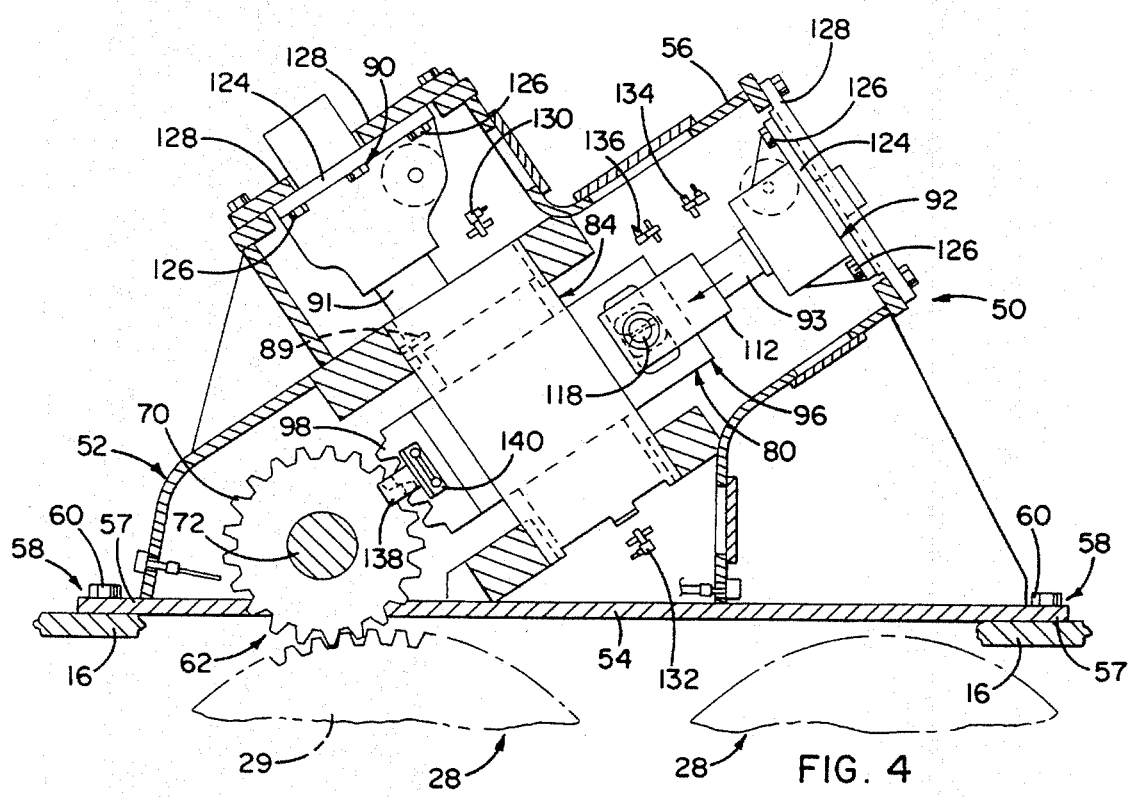
FIG. 4
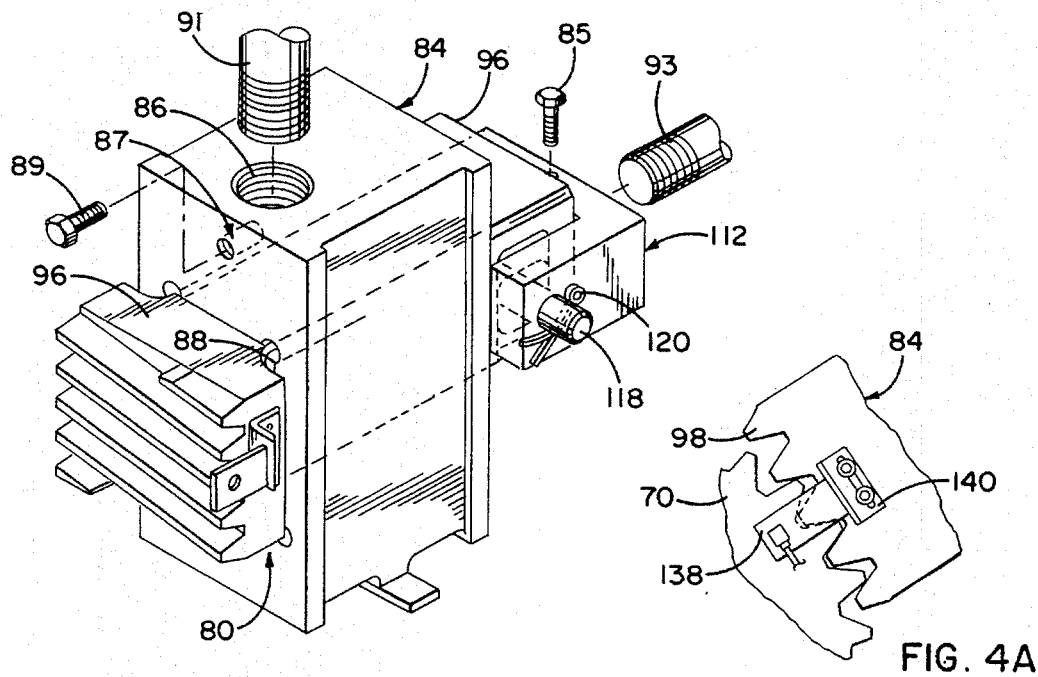
FIG. 5
FIG. 4A

GEAR TRAIN LOCKING MECHANISM FOR MECHANICAL POWER PRESSES

FIELD OF THE INVENTION

This invention relates generally to mechanical power presses and more particularly to a gear train locking mechanism for preventing the reciprocating slide of a mechanical power press from inadvertently moving during maintenance procedures.

BACKGROUND OF THE INVENTION

Large scale mechanical power presses are used in a wide range of industries to perform an equally wide range of tasks. For example, in the automotive industry power presses are often used to stamp steel or sheet metal into relatively small car parts such as engine struts as well as significantly larger vehicle body components such as deck lids, doors, and quarter panels. Depending upon the application, these power presses can be designed to generate forces of 4000 tons or more. Thus, while mechanical power presses are extremely useful industrial tools, the large forces they generate create a potential for severe physical injury to operators and maintenance personnel.

There are many instances in which operating or maintenance personnel could potentially be placed at risk. For example, due to the tremendous forces and impacts involved in the operation of these mechanical power presses, the dies carried by the presses experience considerable stress and must be subjected to periodic maintenance procedures. Some of the more extensive maintenance procedures such as re-grinding require the removal of the dies from the press. Thus, the press presents little danger to personnel during these procedures. However, more minor maintenance procedures such as removing minor blemishes from the dies involve on-press adjustments which often require maintenance personnel to place portions of their bodies between the dies of the press. On-press maintenance operations such as these thus present considerable safety concerns. Should a power press accidentally cycle to the closed position while being serviced by maintenance personnel, an unfortunate individual caught within the press could easily suffer death or dismemberment.

The realities of press operation in an industrial setting, thus, present an operator with competing concerns. On the one hand, an operator must minimize the down time of a given press by performing maintenance procedures as quickly and efficiently as possible. On the other hand, the operator must not be subjected to undue risk while performing these maintenance procedures.

In the past, power press designers have addressed these competing concerns by providing power presses with safety blocks which, through the use of attached plugs, shut the press down when they are removed from their storage compartments. These safety blocks must be manually positioned between the upper and the lower halves of the die to prevent the slide from inadvertently moving to its closed position due to a sudden loss of brake or counterbalance, or a break in the connection between the slide and the drive. While these safety blocks are effective in preventing accidental injury when properly employed, operators and maintenance personnel unfortunately sometimes forget or choose to forego using them when working on the press or dies. Thus, the overall effectiveness of these safety blocks is reduced by human error and carelessness.

In addition, since safety blocks typically have a fixed length, they can only be used to fix the position of a press slide at a specific height. However, some maintenance procedures are more easily performed with the press stopped at different points in its cycle (i.e. with the slide stopped at different heights in the stroke). Since power presses are typically provided with a single set of safety blocks having a single fixed length, maintenance personnel must choose between performing certain maintenance procedures with the slide secured by the safety blocks at a height which is improper for that given procedure, and foregoing the use of the blocks altogether while performing that procedure with the slide adjusted to a convenient height.

While it is not known that any prior inventor had locked a power press gear train in accordance with the present invention, a prior art device for locking the gear train of a transfer feed mechanism used to transfer work pieces into the work area of a transfer feed press is illustrated in FIG. 13. As illustrated in FIG. 13, this prior art locking device operated similarly to the instant gear train locking mechanism for mechanical power presses. However, since the prior art locking mechanism was used to prevent a transfer feed mechanism from moving rather than to lock the gears of a mechanical power press, it employed substantially smaller mechanical jacks than the instant invention (10 and 20 ton jacks as compared to 50 and 150 ton jacks on the present invention). In addition, unlike the instant invention, the prior art locking mechanism did not include an idler gear but instead selectively meshed directly with the gears of the transfer feed mechanism as illustrated in FIG. 13.

OBJECTS OF THE INVENTION

It is therefore a general object of the present invention to provide an improved safety mechanism for mechanical power presses. More specifically, it is an object of the invention to provide a gear train locking mechanism for preventing the reciprocating slide of a mechanical power press from inadvertently moving during maintenance procedures. It is a related object to provide a gear train locking mechanism that protects operating and maintenance personnel from injury during maintenance procedures and the like.

It is still another object to provide a gear train locking mechanism which prevents operating and maintenance personnel from accessing the work area of a power press until the gear train locking mechanism is activated. It is a related object to provide an automatic safety mechanism which cannot be forgotten or ignored by operating or maintenance personnel.

SUMMARY OF THE INVENTION

The present invention accomplishes these objectives and overcomes the drawbacks of the prior art by providing a gear train locking mechanism for securing a power press in a locked position during maintenance procedures and the like. The gear train locking mechanism includes an idler gear which is enmeshed with a drive gear of the power press for rotation therewith, a movable arm assembly including gear engaging means positioned for selectively engaging the idler gear, and a first jack for translating the gear engaging means of the movable arm assembly into engagement with the idler gear to prevent rotation of the idler and drive gears thereby preventing the press from cycling.

In the preferred embodiment, the gear train locking mechanism is further provided with a second jack. In this embodiment, the first jack translates the arm assembly in a first plane between a retracted position and an extended position, and the second jack translates the gear engaging means of the arm assembly in a second plane between a disengaged position and an engaged position. The movement of the arm assembly is preferably controlled by a control system which provides the jacks with control signals to selectively translate the gear engaging means of the arm assembly into operative engagement with the idler gear to prevent the drive gear of the power press from rotating and the reciprocating slide from inadvertently cycling during maintenance procedures and the like.

These and other features and advantages of the invention will be more readily apparent upon reading the following description of the preferred embodiment of the invention and upon reference to the accompanying drawings wherein:

BRIEF DESCRIPTION OF THE DRAWINGS

FIG. 4 is a view similar to FIG. 3 but illustrating the arm assembly of the gear train locking mechanism moving towards the engaged position.

FIG. 4A is an enlarged view of the rack of the arm assembly in engagement with the idler gear of the gear train locking mechanism.

FIG. 5 is a right, front perspective view of the movable arm assembly connected to a clevis for securing the movable arm assembly to the engaging jack.

DESCRIPTION OF A PREFERRED EMBODIMENT

Figure 1:
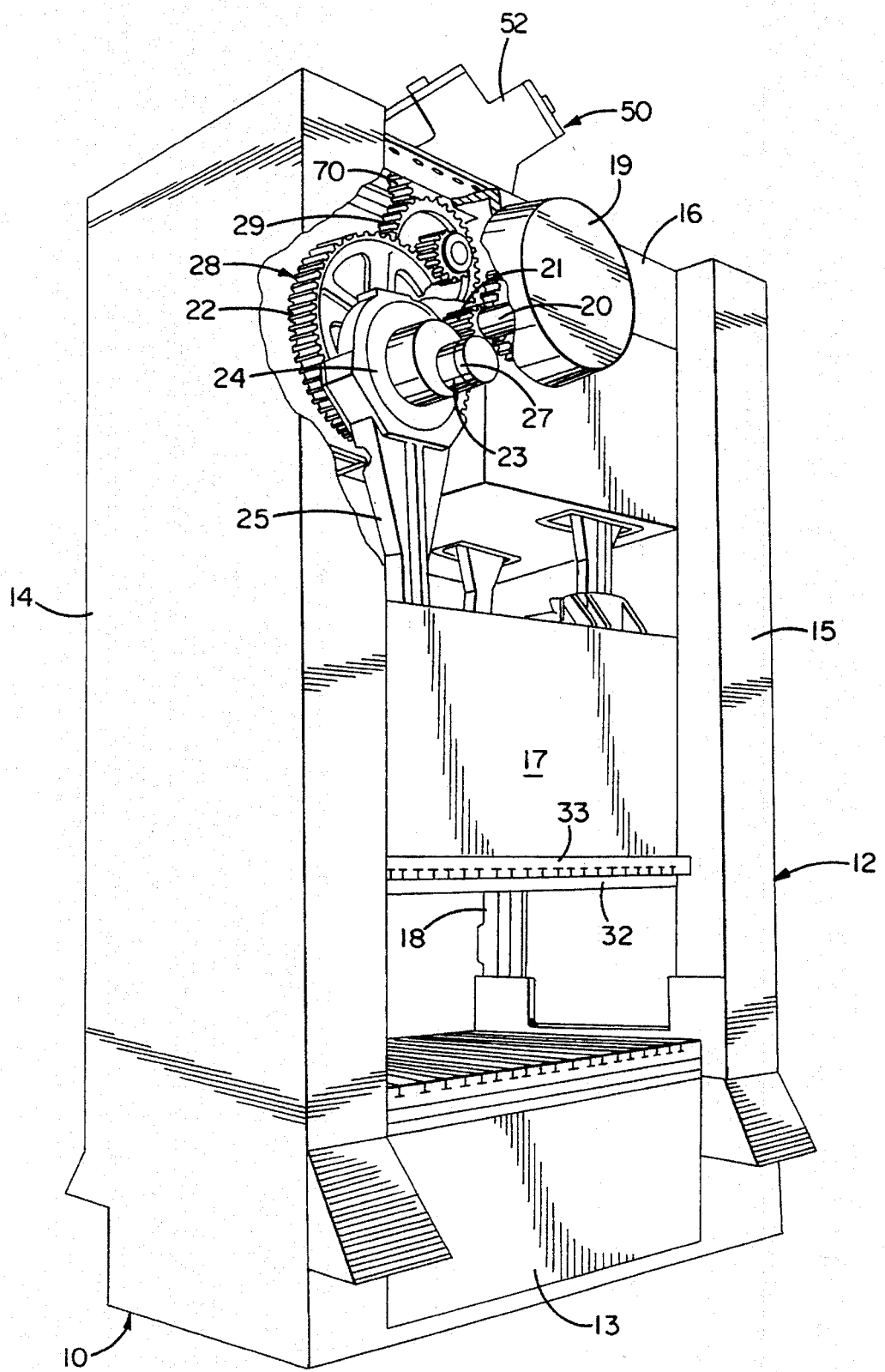
FIG. 1 is a left, front perspective view of a gear train locking mechanism constructed in accordance with the teachings of the present invention and mounted to a mechanical power press.

Turning now to the drawings, FIG. 1 illustrates a gear train locking mechanism 50 constructed in accordance with the teachings of the present invention. In order to clarify the operation, construction, and use of the invention, the gear train locking mechanism 50 has been illustrated in conjunction with a large, mechanical power press 10 which is representative of the type used in industrial applications. It will be appreciated, however, that the mechanical power press is shown only as an example of an environment in which the invention may be utilized. In its broader aspects, the invention is not limited to use in conjunction with any specific type of power press or to any particular type of setting. Rather, the invention may be utilized with any press or apparatus which would benefit as a result of its performance characteristics. For example, although the locking mechanism 50 has been illustrated in connection with a particular type of mechanical power press 10, namely, a single action, four point suspension press, the gear train locking mechanism 50 could also be used with other types of power presses such as transfer feed presses without departing from the scope or spirit of the invention.

The following is a brief recitation of the structure and operation of the mechanical power press 10 illustrated in FIG. 1. As noted above, this press 10 has been included in an effort to more clearly describe the operation and construction of the inventive gear train locking mechanism 50. Thus, the structure of the power press 10 is not central to the operation of the locking mechanism 50 and will not be explained in great detail. Readers who wish to develop a greater understanding of the operation of the illustrated power press are referred to the illustrations and description set forth in Heiberger, U.S. Pat. No. 4,593,547 which is hereby incorporated by reference.

The power press 10 of FIG. 1 has a main frame 12 which comprises a bed 13, a pair of laterally spaced uprights 14, 15, and a crown 16. A reciprocating slide 17 is mounted for vertical reciprocating movement in a guideway defined by a plurality of gibs 18 which are fixed to the frame uprights 14, 15. As illustrated in FIG. 1, the movement of the reciprocating slide 17 is powered by a large motor-driven flywheel 19 in the crown 16. The flywheel 19 is mounted on a drive shaft 20 journalled in the lower portion of the crown 16.

The flywheel 19 delivers power through a differential drive gear train 28 to each of the four press suspension points in the following manner. For each of the four suspension points, the drive shaft 20 has a pinion 21 fixed thereto which is disposed in meshed engagement with a main drive gear 22. The main drive gear 22 is keyed or otherwise fixed to a shaft 23 which is journalled in the crown 16 and which forms an eccentric 24. The eccentric 24 has a pitman 25 drivingly connected thereto and pivotally coupled at a lower end to a hydraulic connection (not shown) on the reciprocating slide 17.

As illustrated in FIG. 1, the slide 17 is a heavy walled, box-like structure slidably mounted in the gibs 18 on the press frame 12. The underside of the slide 17 is generally provided with a mounting surface 33 for carrying an upper die 32 which is typically mounted to cooperate with a lower die to form a workpiece into a desired shape when the press cycles to its closed position. Presses such as the press illustrated in FIG. 1 can be constructed to generate forces in excess of 4000 tons. Thus, cycling the press to its closed position with a workpiece positioned between the upper and lower dies easily deforms the workpiece into a desired shape.

Figure 2:
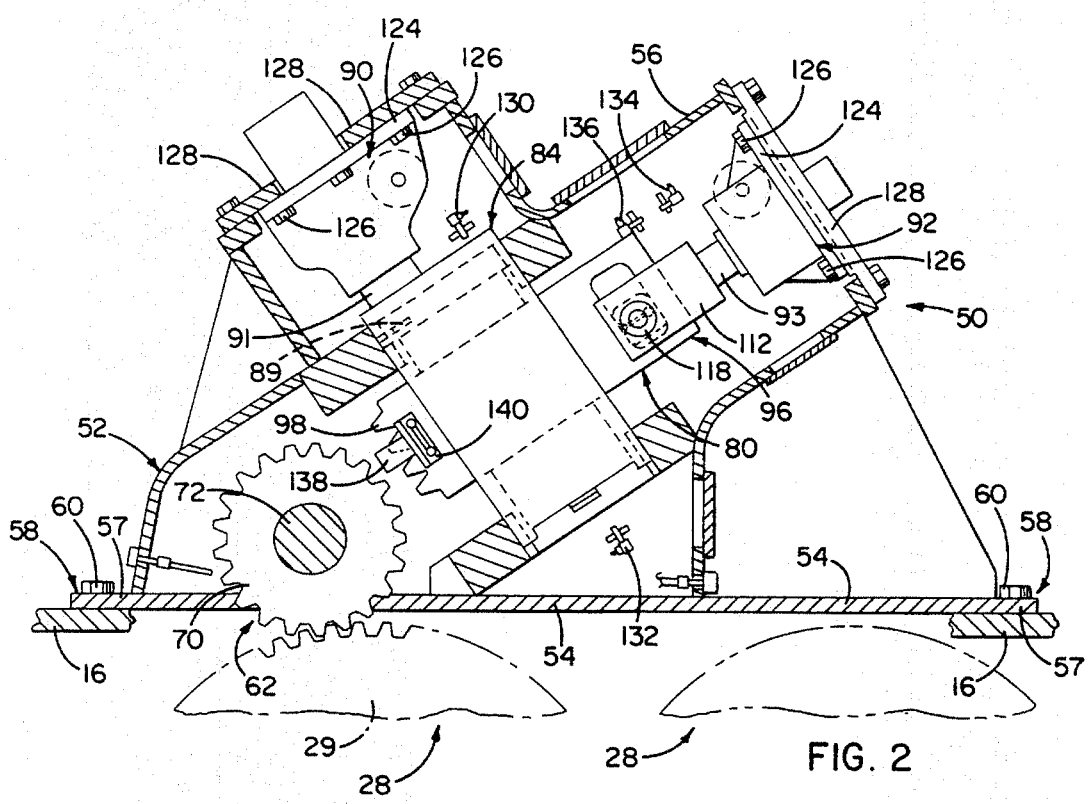
FIG. 2 is a front, cut away view of the gear train locking mechanism illustrating the arm assembly of the mechanism in the home position.
Figure 3:
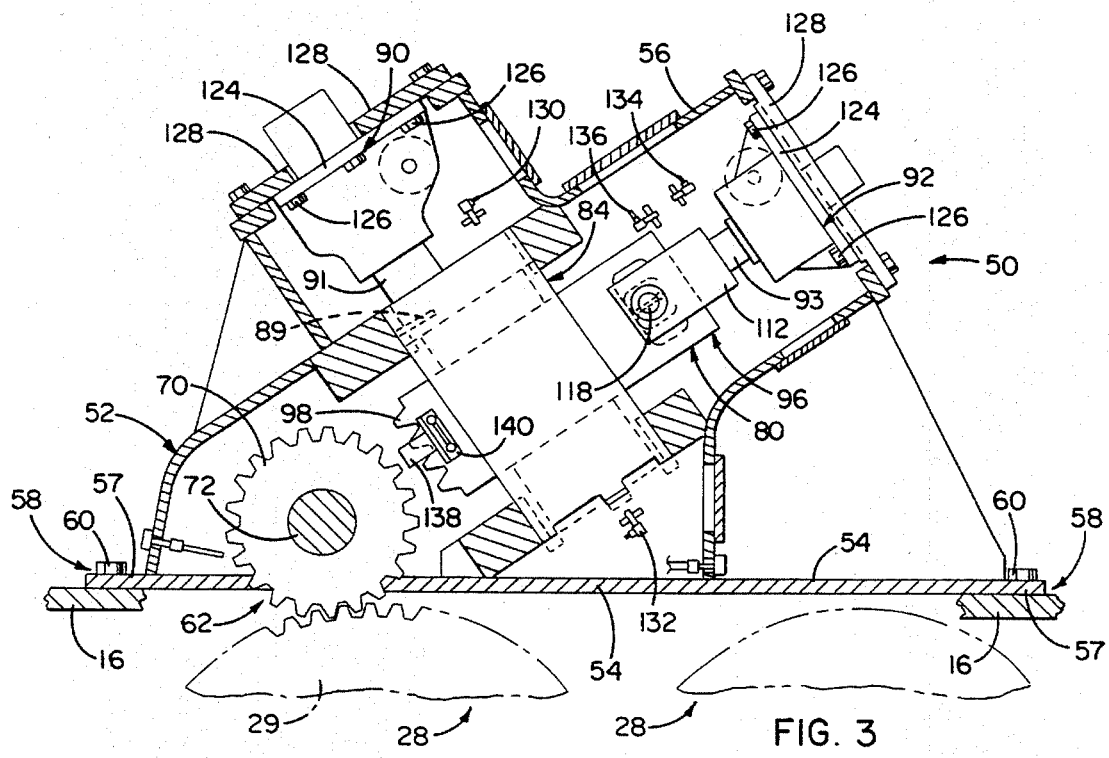
FIG. 3 is a view similar to FIG. 2 but illustrating the arm assembly of the gear train locking mechanism in an intermediate, extended position.

As illustrated in FIG. 1, the gear train locking mechanism 50 is secured to the power press 10 to selectively prevent the reciprocating slide 17 of the press 10 from moving during maintenance procedures and the like. To this end, the gear train locking mechanism 50 is generally provided with a housing 52 including a substantially horizontal floor 54 and multiple walls 56 which combine to separate the internal components of the locking mechanism 50 from the external environment. As shown in FIGS. 2–4, the floor 54 of the housing 52 preferably includes multiple flanges 57 having multiple bores 58 which receive bolts 60 for securing the locking mechanism 50 to the crown 16 of the press 10. It will be appreciated by those skilled in the art, however, that other methods of securing the locking mechanism 50 to the press 10 such as welding, screwing or riveting might likewise be appropriate.

The gear train locking mechanism 50 is preferably provided with an idler gear 70 which is mounted upon a shaft 72 journalled for rotation within the housing 52. As illustrated in FIG. 2, the idler gear 70 is preferably positioned to extend through an aperture 62 in the floor 54 of the housing 52 and an opening in the crown 16 of the press 10 to enmesh with at least one gear 29 of the press' differential drive gear train 28. When the locking mechanism 50 is in the unlocked state, the idler gear 70 is free to rotate with the gears of the gear train 28 of the power press 10. Preferably, the idler gear 50 is mounted so as to rotate with the gear train 28 without substantially adding to the friction and drag experienced by the press 10. When, however, the gear train locking mechanism 50 is in the locked state, the idler gear 70 is prevented from rotating, and the differential drive gear train 28 of the power press is, thus, locked in a fixed position. When the gear train 28 is so locked, the power press 10 cannot cycle and maintenance personnel can service the press without fear of injury.

In order to selectively prevent the idler gear 70 from rotating and the reciprocating slide of the serviced power press 10 from moving, the gear train locking mechanism 50 is provided with a movable arm assembly 80 preferably supported within the housing 52 by two hydraulically operated mechanical jacks, an extending jack 90 and an engaging jack 92. As illustrated in FIGS. 2–4, the mechanical jacks 90, 92 are positioned to translate the arm assembly 80 in substantially perpendicular planes. For example, the extending jack 90 is positioned to translate the arm assembly 80 in a plane substantially parallel to the idler gear 70 between a retracted position and an extended position. The retracted position and the extended position are defined as the position in which the distance between the arm assembly 80 and the extending jack 90 is minimized (See FIG. 2), and the position in which the distance between the arm assembly 80 and the extending jack 90 is maximized (represented by the phantom lines in FIG. 3), respectively. The engaging jack 92, on the other hand, is positioned to translate the arm assembly 80 in a plane substantially perpendicular to the idler gear 70 between a disengaged position (see FIG. 2) and an engaged position. The disengaged position and the engaged position are defined as the position in which the distance between the arm assembly 80 and the engaging jack 92 is minimized, and the position in which the arm assembly 80 and idler gear 70 are enmeshed, respectively. It will, of course, be appreciated by those skilled in the art that in normal operations the movable arm assembly 80 will enmesh with the idler gear 70 before reaching the extended position. It will further be appreciated that the enmeshment of the arm assembly 80 and the idler gear 70 will completely preclude rotation of the idler gear 70, which will in turn prevent the gear train of the power press 10 from moving thereby locking the reciprocating slide 17 of the press 10 in a fixed position.

It should be noted that the mechanical jacks 90, 92 are preferably mounted upon support plates 124 within the housing 52 by bolts 126 which are in turn preferably secured to removable cover plates 128 which form part of the housing 52. The cover plates 128 are preferably removable to provide easy access to the jacks 90, 92 for maintenance and servicing procedures. In addition, it should be noted that each of the mechanical jacks 90, 92 is preferably provided with two solenoids, a first solenoid (not shown) for extending the extendable arm of the jack and a second solenoid (not shown) for retracting the extendable arm. The exact construction of the individual jacks 90, 92 will not be set forth in detail. However, it is noted that while jacks of many different sizes, shapes and construction could be employed in the gear train locking mechanism 50 without departing from the scope and spirit of the invention, in the preferred embodiment a 150 ton mechanical jack manufactured by Joyce/Dayton Corp. of Dayton, Ohio under the product name Joyce Worm Gear Screw Jack is used as the extending jack 90 and a 50 ton mechanical jack also manufactured by Joyce/Dayton Corp. of Dayton, Ohio under the product name Joyce Worm Gear Screw Jack is used as the engaging jack 92. Although these 50 and 150 ton mechanical jacks are preferred, it will be appreciated by those skilled in the art that the tonnage of the mechanical jacks 90, 92 can be varied to approximate the tonnage of the locked power press. Thus, mechanical jacks having larger tonnage can be used with larger power presses and mechanical jacks having lower tonnage can be used with smaller power presses. The interested reader is referred to the product literature available from the above-identified manufacturer for further detail on the operation and construction of the mechanical jacks.

Finally, it should be noted that the mechanical jacks are each mechanically driven by a motor (not shown) associated with the above-described solenoids. Again, since the exact construction of the mechanical jacks and their drive means form no part of the instant invention, and since these jacks and motor constructions are well known to those skilled in the art, in the interest of brevity the construction and operation of the mechanical jacks and motors will not be set forth in detail.

Figure 6:
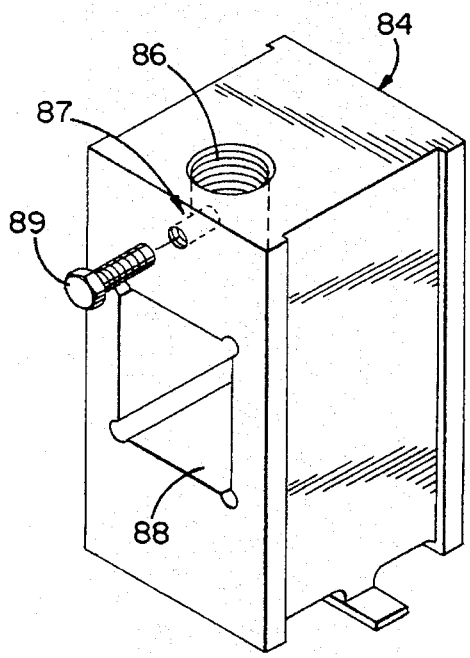
FIG. 6 is a right, front perspective view of the block guide of the movable arm assembly.

As illustrated in FIG. 5, the arm assembly itself is constructed to permit movement in the two perpendicular planes described above. Specifically, the arm assembly 80 includes a block guide 84 which is moved by the extending jack 90 between the extended and retracted positions. As illustrated in FIG. 6, the block guide 84 is a rectangular structure defining two apertures, a circular aperture 86 and a rectangular aperture 88. The circular aperture 86, which is formed in the top of the block guide 84, receives the extendable arm 91 of the extending jack 90 which is secured in fixed relation to the block guide 84 by a bolt or screw 89 disposed in a bore 87 which communicates with circular aperture 86. On the other hand, the rectangular aperture 88 of the block guide 84 is dimensioned to slidably receive a second component of the movable arm assembly 80, specifically, gear engaging means 96. As illustrated in FIG. 5, the gear engaging means 96 preferably comprises a movable rack 96. However, it will be appreciated by those skilled in the art that other gear engaging means can be used with or without a block guide without departing from the scope and spirit of the invention. For example, the arm assembly 80 could include a half-moon shaped gear engaging means which pivots in a semi-circular manner into and out of engagement with the idler gear 70 without departing from the invention. Nonetheless, in the preferred embodiment, the gear engaging means comprises a movable rack 96 as hereinafter described.

Figure 7:
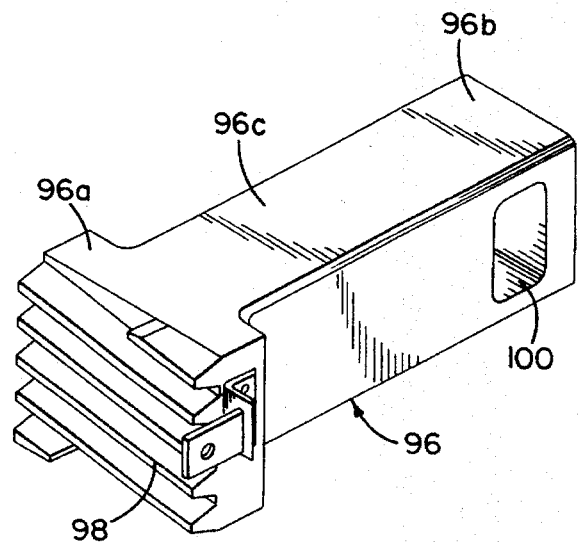
FIG. 7 is a right, front perspective view of the rack of the movable arm assembly.

Specifically, as illustrated in FIG. 7, the movable rack 96 is a T-shaped structure having a proximal end 96*a* and a distal end 96*b* with an intermediate portion 96*c* disposed therebetween. The proximal end 96*a* of the movable rack 96 is larger than the distal end 96*b* and includes a plurality of teeth 98 which are dimensioned to enmesh with the idler gear 70. As illustrated in FIG. 5, the intermediate portion 96*c* of the movable rack 96 is slidably received by the block guide 84. To this end, the intermediate portion 96*c* of the movable rack 96 is only slightly smaller than the block guide's rectangular aperture 88. Thus, while the movable rack 96 can freely slide through aperture 88, any vertical movement of the block guide 84 will immediately be reflected in the vertical position of the rack 96. The distal end 96*b* of the movable rack 96 defines a rectangular opening 100 which is used to slidably couple the rack 96 to the engaging jack 92. Since the engaging jack 92 is fixedly attached to the housing 52 and since the rack 96 moves with the guide block 84 in a plane substantially perpendicular to the plane of movement of the engaging jack 92, the coupling between the rack 96 and the engaging jack 92 is specially constructed to permit the rack 96 to move relative to the jack 92 without separating.

Figure 8:
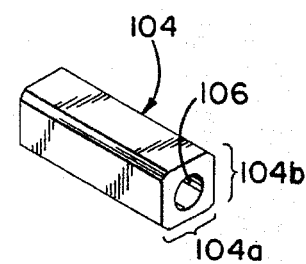
FIG. 8 is a left, front perspective view of a slide block used to couple the movable arm assembly to the engaging jack.

Specifically, opening 100 in the distal portion 96*b* of the movable rack 96 receives a slide block 104 having a first side 104*a* which is roughly equivalent to the short side of opening 100 and a second side 104*b* which is shorter than the long side of rectangular opening 100 as illustrated in FIGS. 7 and 8. As will be appreciated by those skilled in the art, these dimensions permit the slide block 104 to slide within the opening 100 in a controlled fashion. This sliding movement is preferably facilitated by providing the slide block 104 with chamfered edges 105. Finally, the slide block 104 includes a central bore 106 forming an open ended channel whose purpose will be explained momentarily.

Figure 9:
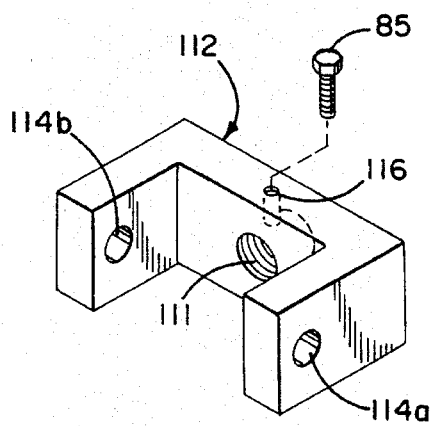
FIG. 9 is a right, front perspective view of the clevis of FIG. 5.

Once slide block 104 is positioned within the opening 100 of the movable rack 96, a clevis 112 as illustrated in FIG. 9 is used to secure the slide block 104 to the extendable arm 93 of the engaging jack 92. As illustrated in FIG. 9 clevis 112 is a U-shaped structure defining three separate apertures 114*a*, 114*b*, 115. Two of the apertures 114*a*, 114*b* are disposed in opposite sides of the U-shaped structure while the third aperture or bore 115 is centrally formed in the clevis' base as shown in FIG. 9. The third aperture 115 communicates with a bore 116 which receives a bolt or screw 85 in a manner similar to the aperture 86, bore 87 and bolt 89 of the block guide 84. Thus, the extendable arm 93 of the engaging jack 92 can be secured in the third aperture 115 of the clevis 112 in the same way the extendable arm 91 of the extending jack 90 is secured in aperture 86 of the block guide 84. Once secured in this fashion, clevis 112 can be translated between the engaged and disengaged positions by engaging jack 92.

The first and second apertures 114*a*, 114*b* of clevis 112 are aligned. Thus, when the clevis 112 receives the distal end 96*b* of the rack 96, the apertures 114*a*, 114*b* of the clevis 112 and the central bore 106 of the slide block 104 also align. The entire assembly—the engaging jack 92 and its extendable arm 93, the clevis 112, the slide block 104, and the rack 96—is secured together by a clevis pin 118 which passes through the apertures 114*a*, 114*b* of the clevis 112 and the central bore 106 of the slide block 104 as illustrated in FIG. 5. Cotter pins 120, bolts or the like are fastened to either end of the clevis pin 118 to prevent inadvertent separation of the rack 96 and the clevis 112 during use.

As a result of these connections, the movable arm assembly 80 can be translated in two perpendicular planes by the two mechanical jacks 90, 92. For example, extending jack 90 can move the assembly 80 in a plane between the extended position and the retracted position by applying force via extendable arm 91 to block guide 84. This movement is enabled by the clevis and slide block arrangement described above which permits the movable rack 96 to move relative to engaging jack 92. On the other hand, the engaging jack 92 can translate the movable arm assembly 80 in a second plane between the engaged position and the disengaged position by applying suitable force via the extendable arm 93 to the movable rack 96. This movement is permitted despite the arm assembly's connection to the extending jack 90 because movable rack 96 can freely slide through block guide 84 without effecting extending jack 90.

Although the locking mechanism 50 has been described as mounted upon the crown 16 of the power press 10, it will be appreciated by those skilled in the art that other mounting locations might likewise be appropriate. For example, if the locking mechanism 50 is to be used in conjunction with an underdrive press where the gear train is located beneath the reciprocating slide, the locking mechanism 50 can be mounted adjacent the press base to enmesh with the gear train. Or, if the gear train of the power press is most easily accessed through an aperture in one of the uprights of the press, the gear train locking mechanism 50 can be mounted on the side of that press. Thus, the location of the locking mechanism 50 can be adjusted based on the construction of the apparatus serviced by the locking mechanism 50 without departing from the scope or spirit of the invention.

In addition, although the foregoing construction is preferred, it will be appreciated by those skilled in the art that the idler gear 70 is optional. Thus, the idler gear 70 can be excluded from the gear train locking mechanism without departing from the scope or the spirit of the claimed invention. It will be appreciated that, if the idler gear 70 is excluded, the movable arm assembly will directly engage the drive gear of the power press 10 to selectively prevent the reciprocating slide 17 of the power press from moving during maintenance procedures and the like. It should be noted, however, that the preferred embodiment includes the optional idler gear 70 to permit the locking mechanism 50 to be pre-adjusted in the factory thereby obviating the need for customer adjustments in this regard.

Further, although the foregoing construction of the movable arm assembly 80 is preferred, it will be appreciated by those skilled in the art that the invention can be practiced using a movable arm assembly which is translatable in only a single plane. For example, a movable arm assembly 80' consisting solely of a translatable rack 96' affixed to a single jack 92' could be used without departing from the scope or spirit of the invention. In this embodiment, the movable arm assembly 80' would simply translate back and forth in a single plane into and out of engagement with the idler gear 70 (if included). Depending upon the weight of the arm assembly 80' employed, a bracket similar to guide block 86 but fixed directly to the housing 50' instead of to a second mechanical jack might be used to carry some of the weight of the arm assembly 80' and lessen the stress on jack 92'.

Despite this alternative, the bi-planar approach described above is preferred because it enables the gear engaging means 96 of the movable arm assembly 80 to engage the idler gear 70 regardless of the position in which the press 10 and the idler gear 70 stop. For example, in the preferred embodiment the position of the movable arm assembly 80 can be easily adjusted to permit the enmeshment of the teeth 98 of movable rack 96 with the idler gear 70 regardless of the idler gears' position.

In order to monitor and control the position and movement of the movable arm assembly 80, the preferred embodiment of the gear train locking mechanism 50 is provided with a control system comprising the control circuit illustrated in FIGS. 10A–10E and a plurality of proximity detectors. The proximity detectors are positioned throughout the housing 52 of the locking mechanism 50 and provide the control circuit with control signals indicating the position of the movable arm assembly 80. The control circuit, on the other hand, is preferably a hard wired relay panel (not shown) which is mounted to the existing control enclosure (not shown) of the serviced press 10. Thus, unlike the proximity detectors, the control circuit is preferably positioned external to the locking mechanism 50. Together, the proximity detectors and the control circuit form a feedback circuit for accurately controlling the position of the arm assembly 80.

As illustrated in FIGS. 2–4, the plurality of proximity detectors includes a retracted position proximity detector 130 disposed adjacent the extending jack 90; an extended position proximity detector 132 disposed adjacent the floor 53 of the housing 52; a disengaged position proximity detector 134 disposed adjacent the engaging jack 92; and an engaged position proximity detector 136 disposed near the disengaged position detector 134. As their names imply, these proximity detectors 130, 132, 134, 136 are positioned to detect when the movable arm assembly 80 is disposed in the retracted, extended, disengaged and engaged positions, respectively. As shown in FIGS. 2–4, the locking mechanism 50 also includes a fifth proximity detector 138 which is disposed upon a bracket 140 extending from the proximal end 96a of the movable rack 96 for detecting when the teeth 98 of the rack 96 and the idler gear 70 are aligned for enmeshment. These five proximity detectors 130, 132, 134, 136, 138 constantly monitor the position of the movable arm assembly 80 to insure that the locking mechanism 50 is functioning properly.

It should be noted that all of the proximity detectors employed in the preferred embodiment of the gear train locking mechanism 50 are standard, commercially available products which are well known to those skilled in the art. For example, while it will be appreciated that other sensors can be employed without departing from the scope or spirit of the invention, the gear train locking mechanism 50 preferably employs the standard proximity sensors manufactured and sold by Turck, Inc. of 3000 Campus Dr., Minneapolis, Minn. 55441 under the product name Inductive Sensors as proximity detectors 130, 132, 134, 136 and 138.

Preferably, the entire control system is redundantly wired to insure that the failure of any one device in the system will not cause the locking mechanism 50 to malfunction. For example, although the proximity detectors 130, 132, 134, 136, 138 have been described as each comprising a single detector specifically disposed in specific locations throughout the locking mechanism 50, in the preferred embodiment each of the five proximity detectors 130, 132, 134, 136, 138 actually include two sensors. Thus, the retracted position proximity detector 130 described above is preferably actually two proximity detectors each positioned in precisely the same orientation to monitor precisely the same movements. This redundancy improves the safety of the locking mechanism 50 by, in effect, double checking every reading that the sensors make. Thus, if the pair of proximity detectors which actually comprise the engaging position proximity detector 136 sense different events, i.e. one sensor detects the rack 96 in the engaged position and the other sensor does not, the control system will immediately be apprised that a malfunction has occurred and the corrective steps set forth in detail below will be initiated. Similarly, many of the relays contained in the control circuit are also redundantly wired. Thus, if one of a pair of redundantly wired relays malfunctions, the pair of relays will have conflicting logic states. These conflicting logic states will immediately be interpreted by the control system to indicate that the locking mechanism 50 has malfunctioned and, again, corrective steps will be initiated.

Before delving into a detailed explanation of the construction and operation of the preferred control circuit illustrated in FIGS. 10A–10E, it will be helpful to provide a brief overview of the general operation of the locking mechanism 50. When an operator wishes to secure a power press 10 in a locked position in order to perform a maintenance procedure or the like, the operator first brings the press 10 to a stop in the manner dictated by the press 10 being serviced. As explained in detail below, the control system maintains the movable arm assembly 80 of the locking mechanism 50 in the home position illustrated in FIG. 2 whenever the press 10 is operating to insure that the rack 96 and the idler gear 70 are not inadvertently engaged. As shown in FIG. 2, the home position occurs when the arm assembly 80 is disposed in the retracted and disengaged positions. Consequently, whenever the operator initiates the locking sequence, the arm assembly 80 will always be disposed in the home position.

In order to initiate the locking sequence, the operator must throw either of the two operating switches provided on the press 10 from the unlock position to the lock position. These switches, whose location depends upon the construction of the press being serviced, provide the control system of the locking mechanism 50 with a control signal indicating that the locking sequence should begin. In response to this signal, the extending jack 90 applies a force to the block guide 84 which causes the movable arm assembly 80 to move downward relative to the idler gear 70. This downward movement will continue until the alignment proximity detector 138 senses that the teeth 98 of the rack 96 and the idler gear 70 are aligned. The extending jack 90 then removes the downward force from the block guide 84 such that the arm assembly 80 stops in position for enmeshment with the idler gear as illustrated in FIG. 3. As shown in FIG. 4, the engaging jack 92 then applies a force to the arm assembly 80 causing the rack 96 to move forward relative to block guide 84. This movement will continue until the rack 96 and the idler gear 70 enmesh as illustrated in FIG. 4A. At this point, the idler gear 70 can no longer rotate and the gear train of the power press 10 is locked in a fixed position. The press 10 can then be serviced without fear of the slide moving.

It will be appreciated by those skilled in the art that this process, i.e. locking the press 10 in a fixed position, can be completed regardless of where the press 10 happens to stop in the cycle. In other words, the inventive gear train locking mechanism 50 can be used to lock the press 10 at any desired point in the press cycle. Thus, operating personnel can lock the press 10 with the reciprocating slide 17 secured at the stroke position that best facilitates the maintenance and servicing procedure the operating personnel wish to perform.

It will further be appreciated by those skilled in the art that the reverse process, unlocking the press 10, is accomplished by performing the reverse of the locking sequence described above. Thus, the operator must first throw both of the operating switches to the unlock state. In response, the engaging jack 92 retracts the rack 96 of the arm assembly 80 into the disengaged position illustrated in FIG. 3. The extending jack 90 then applies an upwardly directed force to the block guide 84 which returns the arm assembly 80 to the home position shown in FIG. 2. The press 10 can then be freely operated.

Turning now to the preferred embodiment of the control circuit illustrated in FIGS. 10A–10E, it can be seen that, as explained above, each proximity detector 130, 132, 134, 136, 138 actually comprises two proximity detectors. Thus, as illustrated in lines 106–115 of FIG. 10A, proximity detectors 106-prx and 107-prx together comprise alignment detector 138; proximity detectors 108-prx and 109-prx together comprise extended position proximity detector 132; proximity detectors 110-prx and 111-prx together comprise retracted position proximity detector 130; proximity detectors 112-prx and 113-prx together comprise engaged position proximity detector 136; and proximity detectors 114-prx and 115-prx together comprise disengaged position proximity detector 134. As explained above, each of these proximity detectors are positioned to detect the presence of the movable arm assembly 80. These detectors function similarly to an electrical switch having an off state and an on state. Thus, if the movable arm assembly 80 approaches within a predetermined distance of a given detector, that detector switches "on" and passes an electrical signal to a connected electrical device. Conversely, if the movable arm assembly 80 is not within range of a given detector, that detector remains in the "off" or "open" position and will not transmit a signal. Thus, the proximity detectors, in effect, generate a high logic signal when the arm assembly 80 enters its sensing range and a low logic signal at all other times.

Figure 10A:
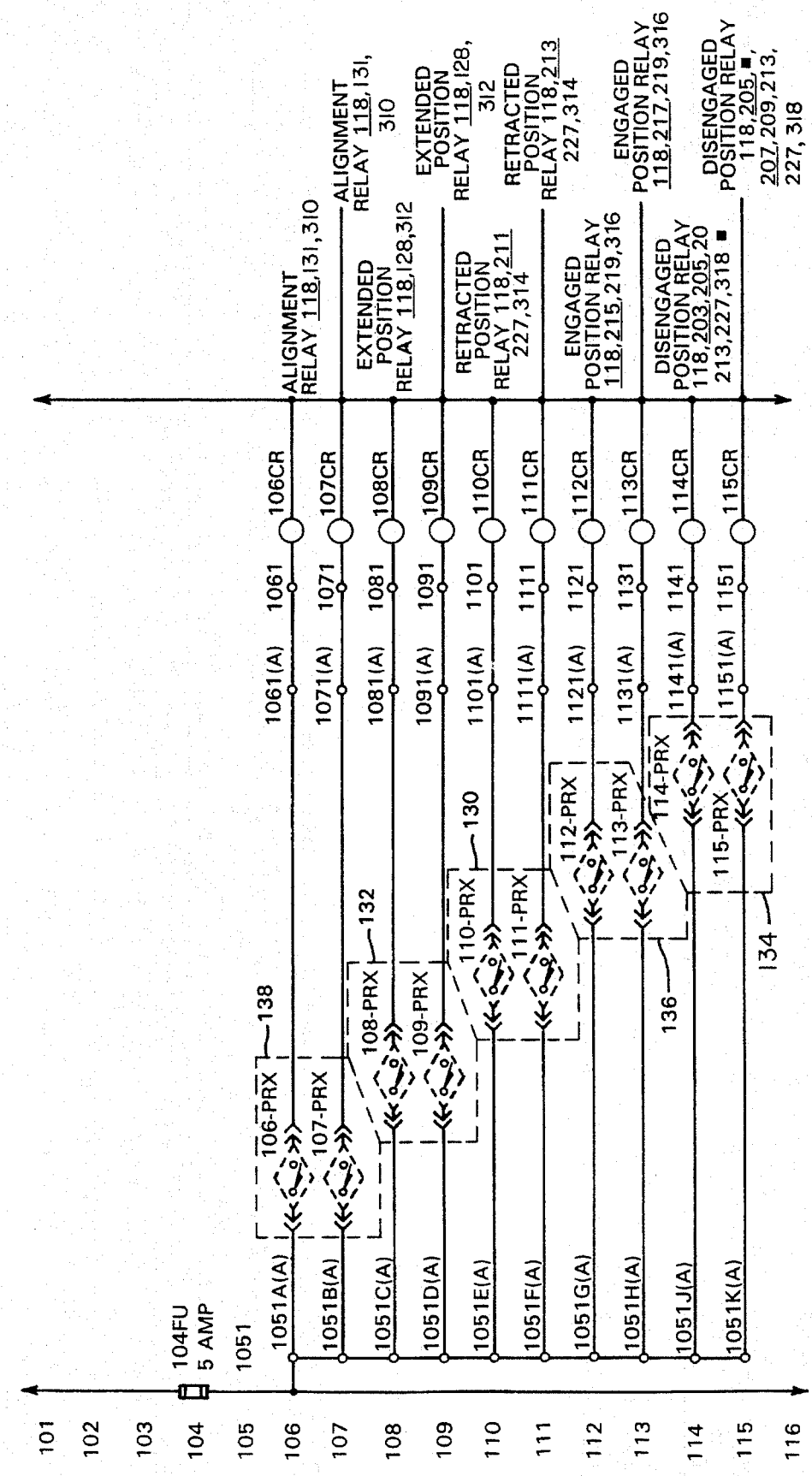
FIG. 10A is a circuit diagram illustrating a first portion of the preferred control circuit for the gear train locking mechanism.

As illustrated in FIG. 10A, each of the proximity detectors (106-prx through 115-prx) is electrically connected to a relay coil (106cr–115cr) whose logic state is determined by the signal generated by its connected proximity detector. For example, if proximity detector 109-prx detects the presence of the movable arm assembly 80, it will transmit an electrical signal that will drive relay coil 109cr to a high logic state. Conversely, if the arm assembly 80 is outside the sensing range of detector 109-prx, relay coil 109cr will not receive an electrical signal and will, thus, enter the low logic state. The logic states of these and other relays determine when and how the mechanical jacks 90, 92 will move the arm assembly 80 as set forth below. Further, the proximity detectors constantly monitor the position of the arm assembly 80. Consequently, the logic states of the detector's attending relays (106cr–115cr) change in accordance with the arm assembly's movements.

It will be appreciated by those skilled in the art that throughout FIGS. 10A–10E, each individual relay connected in a given line is represented by a pair of vertical lines labelled with the corresponding relay number. Further, it will be appreciated that a slash through an individual relay such as relay 106cr in line 118 of FIG. 10B indicates that the logic state of that relay must be low for the relay coil connected at the end of that line to be switched to the high logic level. Conversely, an unslashed relay such as relay 110cr in line 118 must have a high logic level for the relay coil (represented by a circle labelled with a relay number) at the right of the logic line to be in the high logic state. Moreover, it will be appreciated that when a plurality of relays are connected in series as in line 126 of FIG. 10B, the relay coil at the end of the logic line (i.e., relay coil 126cr) will only have a high logic level if all of the connected relays have the logic states indicated by the slashed (normally closed) and unslashed (normally open) symbols.

For ease of discussion, the redundant nature of the proximity detectors and their attending relays will be largely ignored throughout this discussion and the detectors will simply be referred to as: the retracted position detector 130 (proximity detectors 110-prx and 111-prx), the extended position detector 132 (proximity detectors 108-prx and 109-prx), the disengaged position detector 134 (proximity detectors 114-prx and 115-prx), the engaged position detector 136 (proximity detectors 112-prx and 113-prx), and the alignment detector 138 (proximity detectors 106-prx and 107-prx) for the remainder of this discussion. Similarly, the attending relays of the paired proximity detectors will also be referred to as: the retracted position relay (relays 110cr and 111cr), the extended position relay (relays 108cr and 109cr), the disengaged position relay (relays 114cr and 115cr), the engaged position relay (relays 112cr and 113cr), and the alignment relay (relays 106cr and 107cr). Moreover, unless otherwise specified, it will be assumed that the proximity detectors and the relays are all functioning properly, i.e. paired devices are always in the same state.

Figure 10B:
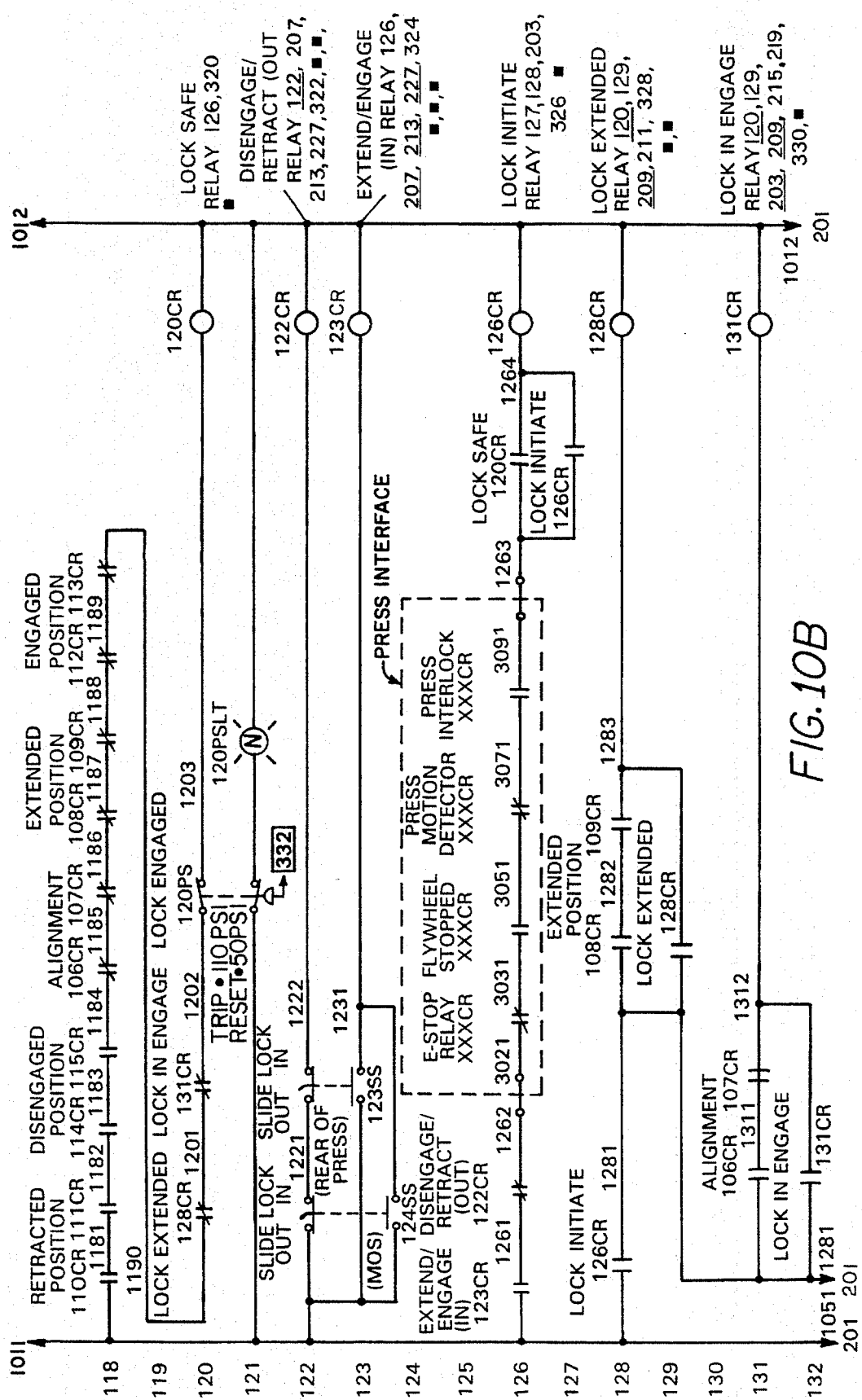
FIG. 10B is a circuit diagram similar to FIG. 11A but illustrating a second portion of the preferred control circuit.

As mentioned above, the locking sequence of the gear train locking mechanism 50 is initiated by throwing either of two operating switches to the lock position. These operating switches can be seen at lines 122–124 of FIG. 10B where they are labelled "slide lock out in 1221" and "slide lock out in 1222". As shown in FIG. 10B, these switches are preferably connected to a disengage/retract relay coil 122cr and an extend/engage relay coil 123cr. The disengage/retract relay coil 122cr will have a high logic state and the extend/retract relay coil 123cr will have a low logic state whenever both switches are thrown to the lock position (i.e., the switches are aligned on line 122). Conversely, the disengage/retract relay coil 122cr will have a low logic state and the extend/engage relay coil 123cr will be in the high logic state whenever either operating switch is thrown to the unlock position (i.e. lines 122 and 123).

Turning now to lines 118–120 of FIG. 10B, it can be seen that the control circuit is provided with a lock safe relay 120cr whose logic state indicates whether it is safe to move the arm assembly 80 into the locked position. The logic state of the lock safe relay 120cr is determined by the individual logic states of the retracted position relay (relays 110cr and 111cr), the disengaged position relay (relays 114cr and 115cr), the alignment relay (relays 106cr and 107cr), the extended position relay (relays 108cr and 109cr), the engaged position relay (relays 112cr and 113cr), a lock extended relay 128cr and a lock in engage relay 131cr. Specifically, the lock safe relay 120cr will only enter the high logic state if the retracted position relay (relays 110cr and 111cr) and the disengaged position relay (relays 114cr and 115cr) are in the high state, and the alignment relay (relays 106cr and 107cr), the extended position relay (relays 108cr and 109cr), the engaged position relay (relays 112cr and 113cr), the lock extended relay 128cr and the lock in engage relay 131cr are in the low state. It will be appreciated that relays 106cr–115cr, which reflect the readings of the proximity detectors 130, 132, 134, 136, 138, will only be in these states if the arm assembly 80 is in the home position. Thus, as noted above, the gear train locking mechanism 50, which cannot initiate the locking sequence without a high logic signal from the lock safe relay 120cr, will always start the locking sequence with the arm assembly 80 in the home position.

In addition to requiring the arm assembly 80 to be disposed in the home position, lock safe relay 120cr also requires the lock extended relay 128cr and the lock in engage relay 131cr to have low logic levels. Turning to line 128 of FIG. 10B, it can be seen that neither the lock extended relay 128cr nor the lock in engage relay 131cr can have a high logic level unless the lock initiate relay 126cr also has a high logic level. Turning then to line 126 which determines the logic level of lock initiate relay 126cr, it can be seen that the lock initiate relay 126cr will only achieve a high logic level when, among other conditions, either the lock safe relay 120cr or the lock initiate relay 126cr itself has a high logic level. Since we are assuming that the operator has only just thrown the operating switch to the lock position, neither the lock safe relay 120cr nor the lock initiate relay 126cr has such a logic level. As a result, the initiate lock relay 126cr, the lock extended relay 128cr and the lock in engage relay 131cr will all have a low logic level when the operator throws the operating switch to the locked position. Consequently, if the arm assembly 80 is properly located in the home position, the lock safe relay 120cr will transition to the high logic state.

It should be noted that the control circuit's redundant wiring will prevent the lock safe relay 120cr from ever achieving a high logic level if any one of the proximity detectors (106-prx–115-prx) or their attending relays (106cr–115cr) malfunction. As explained above, each of the proximity detectors 130, 132, 134, 136, 138 are actually two detectors which will always have the same state unless one or both malfunction. This, of course, implies that the relay attending these detectors will also have the same state absent a malfunction in either the detectors or the relays. Any malfunction in the detectors or their attending relays will, thus, cause the paired relays on lines 118–120 to have conflicting states. Since the lock safe relay 120cr can only reach the high logic level if all of the relays connected along lines 118–120 enter their appropriate logic state, a malfunction among the proximity detectors or the relays will prevent the lock safe relay 120cr from leaving the low state. Since the locking mechanism 50 can only be transitioned to the locked position if the lock safe relay 120cr transitions to the high logic level, a malfunction in the proximity detectors or their attending relays will preclude the gear train locking mechanism 50 from operating.

Once the lock safe relay 120cr transitions to the high logic state, the lock initiate relay 126cr will also enter the high logic state. Turning to line 126 of FIG. 10B, it can be seen that the logic level of the lock initiate relay 126cr requires the extend/engage relay 123cr to have a high logic level and the disengage/retract relay 122cr to have a low logic level. As set forth above, these relays 122cr, 123cr will have these logic states whenever one of the operator switches are thrown to the lock position. Since we are assuming the operator has just thrown the switch, these conditions are satisfied.

The lock initiate relay 126cr also requires that various press conditions be met to enter and remain in the high logic condition. To this end, the control circuit can be connected to a press interface which provides the gear train locking mechanism 50 with various information concerning the operating state of the press. Preferably, this information includes a relay indicating that the E-stop relay has a low logic level; the press flywheel relay has a high logic state indicating that flywheel 19 has stopped; the press motion detector relay has a low logic state indicating that the press has stopped; and the press interlock relay has a high logic level as illustrated by the box labelled "PRESS INTERFACE" in FIG. 10B.

Finally, the lock initiate relay 126cr will only enter the high logic state if either the lock safe relay 120cr or the lock initiate relay 126cr has a high logic state. Since the lock safe relay 120cr has recently transitioned to the high logic state, the lock initiate relay 126cr will also now achieve the high logic level. It will be appreciated that upon achieving the high logic level, the lock initiate relay 126cr will retain that state regardless of the logic state of the lock safe relay 120cr. This is achieved by virtue of the parallel connection of the lock safe relay 120cr and the lock initiate relay 126cr between terminals 1263 and 1264 on line 126 of FIG. 10B. Thus, the logic state of the lock safe relay 120cr is only significant with respect to the lock initiate relay 126cr when the lock initiate relay 126cr is in the low logic state. This is important because the logic state of the lock safe relay 120cr will transition to the low state as soon as the arm assembly 80 moves from the home position. Thus, the parallel connection of the lock safe relay 120cr and the lock initiate relay 126cr serves to logically separate the lock safe relay 120cr from the remainder of the circuit after the conditions permitting the lock initiate relay 126cr to transition to the high logic level have been satisfied.

Turning now to line 128 of FIG. 10B, it can be seen that the transitioning of the lock initiate relay 126cr to the high logic state gives rise to the possibility of a logic transition for the lock extended relay 128cr and the lock in engage relay 131cr. However, the lock extended relay 128cr will only transition to the high logic level if the extended position relay (relays 108cr and 109cr) enter the high logic state. The extended position relay (relays 108cr and 109cr) will, of course, only go high if the extended position relay 132 senses that the arm assembly 80 has entered the extended position. Thus, the lock extended relay 128cr will only have a high logic level if the arm assembly 80 moves to the extended position. However, it will be appreciated by those skilled in the art that the parallel connection of the extended position relay (relays 108cr and 109cr) and the lock extended relay 128cr between junctions 1281 and 1283 insures that, once transitioned to the high logic level, the lock extended relay 128cr will remain in that state regardless of the logic state of the extended position relay (relays 108cr and 109cr). As a result, once the arm assembly 80 enters the extended position, the lock extended relay 128cr will remain in the high logic state regardless of the arm assembly's further movements or position.

As mentioned above, the high logic level of the lock initiate relay 131cr also enables the lock in engage relay 131cr to enter the high logic condition. However, as illustrated at line 131 of FIG. 10B, the lock in engage relay 131cr also requires the alignment relay (relays 106cr and 107cr) to have a high logic state. Since the alignment relay, whose logic state is dependent upon the logic condition of the alignment detector 138, will only enter the high logic state when the rack 96 of the arm assembly 80 and the idler gear 70 align, the lock in engage relay 131cr will also enter the high logic level when the arm assembly 80 and the idler gear 70 are so aligned. However, once this alignment occurs, the parallel connection of the alignment relay (relays 106cr and 107cr) and the lock in engage relay 131cr between junctions 1281 and 1312 on line 131 insures that the lock in engage relay 131cr will remain in the high logic state even after the idler gear 70 and the rack 96 are no longer aligned (assuming, of course that the lock initiate relay 126cr remains in the high logic condition).

In order to control the movements and position of the arm assembly 80, the control circuit is electrically connected to the locking mechanism's mechanical jacks 90, 92. As mentioned above, each of the mechanical jacks 90, 92 of the gear train locking mechanism 50 is provided with two solenoids. The extending jack 90 includes an extending solenoid which, when energized, causes the motor associated with the extending jack 90 to extend the extendable arm 91 of the jack 90 such that the arm assembly 80 moves towards the extended position, and a retracting solenoid which, when energized, causes the motor to retract the extendable arm 91 of the extending jack 90 such that the arm assembly 80 moves towards the retracted position. Similarly, the engaging jack 92 includes an engaging solenoid for causing the motor associated with the engaging jack 92 to extend the extendable arm 93 of the engaging jack 92 such that the arm assembly moves towards the engaged position, and a disengaging solenoid for causing the engaging jack 92 to move the arm assembly 80 towards the disengaged position. The connection between the control circuit and the extending jack's solenoids is illustrated by lines 209–213 of FIG. 10C. The connection between the control circuit and the engaging jack's solenoids is illustrated by lines 203–207 and lines 215–217 of FIG. 10C.

Figure 10C:
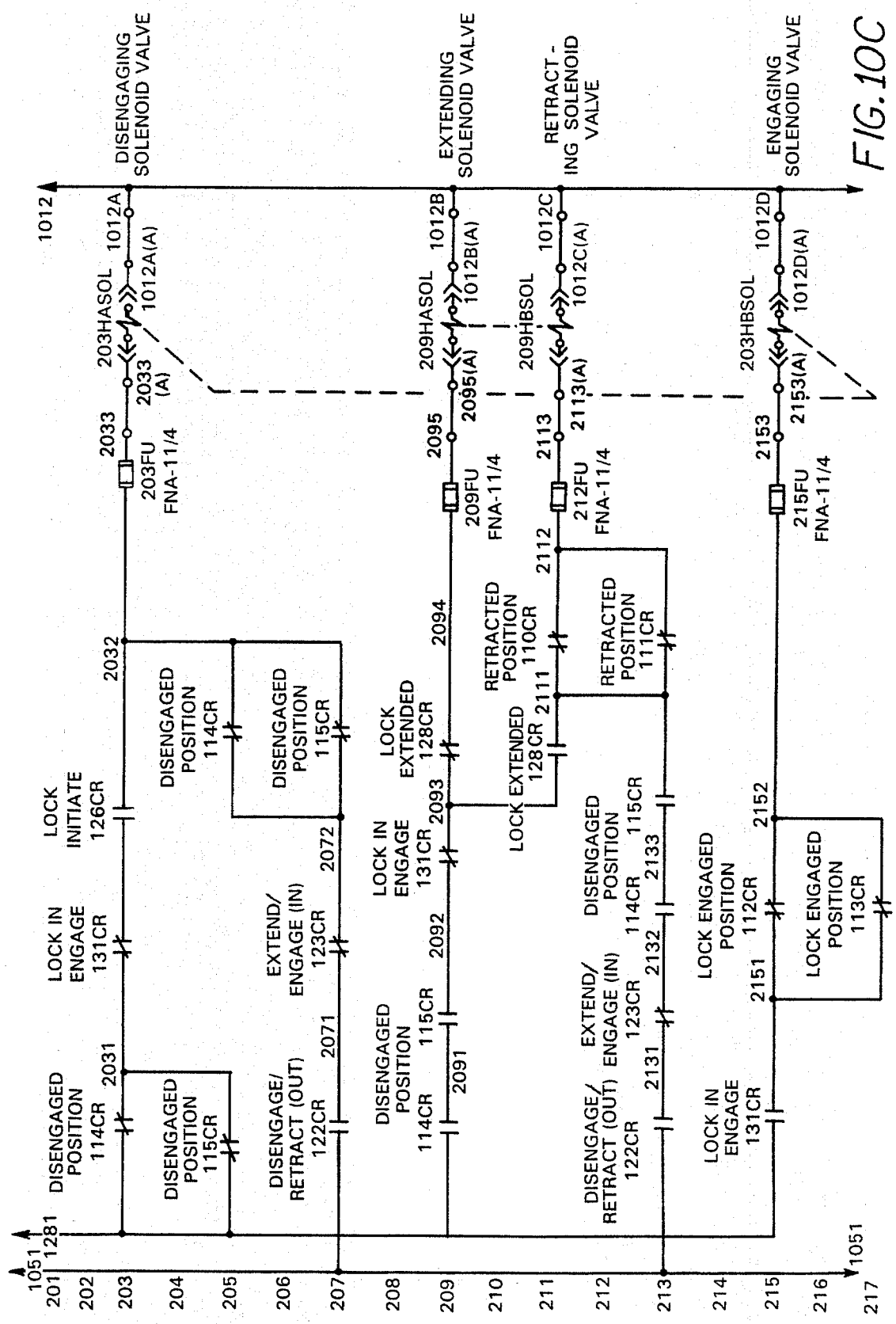
FIG. 10C is a circuit diagram similar to FIGS. 11A and 11B but illustrating a third portion of the preferred control circuit.
Figure 10D:
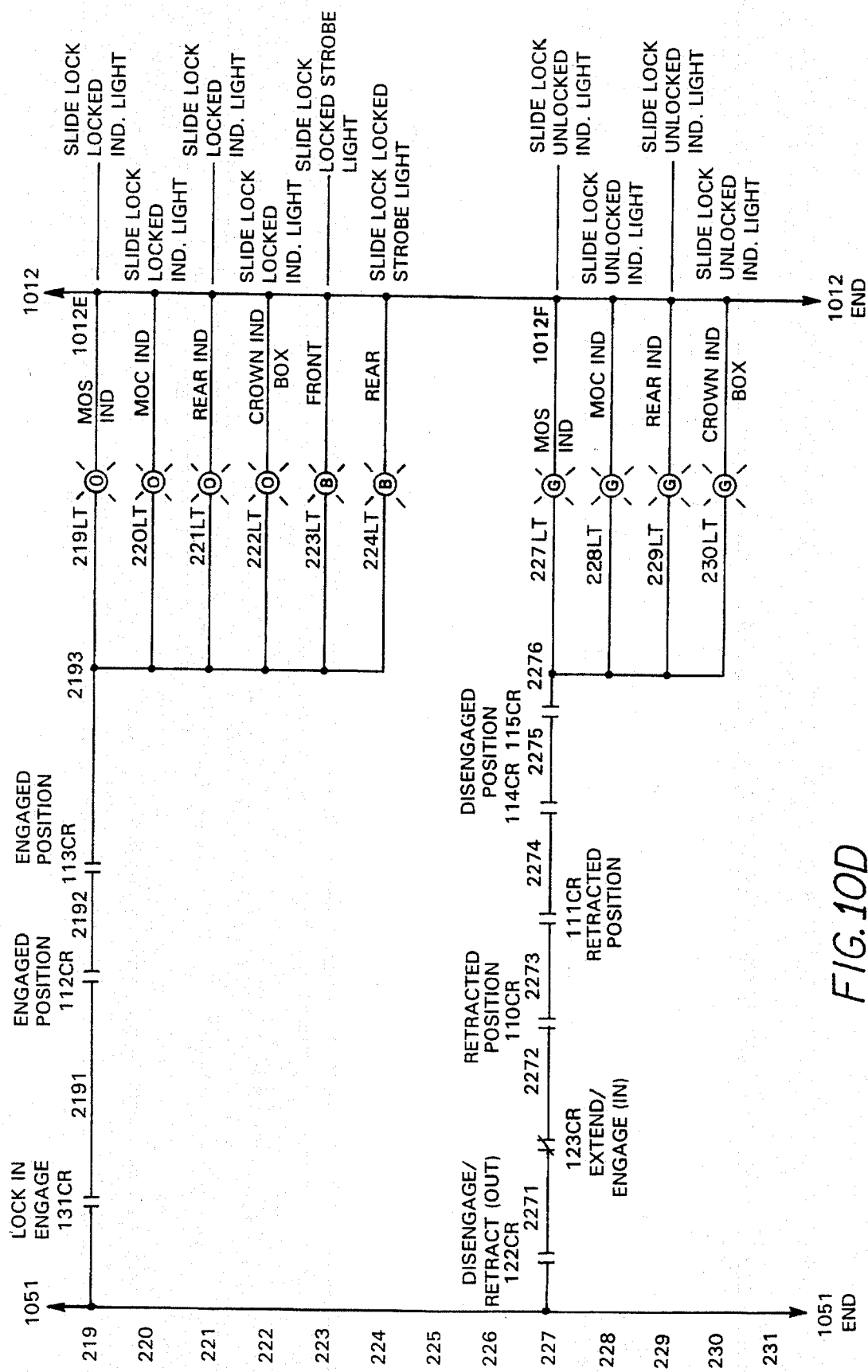
FIG. 10D is a circuit diagram illustrating a fourth portion of the preferred control circuit.

Continuing with our explanation of the control circuit's logic sequence, it can be seen that the extending solenoid of the extending jack 90 will be energized whenever the lock initiate relay 126cr enters the high logic state and the relays illustrated at line 209 of FIG. 10C enter the indicated logic states. Thus, if the lock initiate relay 126cr is high (indicating the press conditions are satisfied, i.e. the press is stopped, and the operating switch is thrown to the lock position), the extending solenoid will be energized if the disengaged position relay (relays 114cr and 115cr) is in the high logic state (indicating that the arm assembly 80 is in the disengaged position), the lock in engage relay 131cr is in the low logic state (indicating that rack 96 of the arm assembly 80 and the idler gear 70 are not aligned for enmeshment), and the lock extended relay 129cr is in the low logic state (indicating that the arm assembly 80 has not already entered the extended position). Thus, when an operator initiates the locking sequence, the control circuit will cause the arm assembly 80 to move towards the extended position until the arm assembly 80 and the idler gear 70 align. However, if for some reason the arm assembly 80 moves out of the disengaged position, or if the arm assembly 80 reaches the extended position without ever aligning with the idler gear 70, the extending solenoid will immediately be deenergized.

Should the arm assembly 80 reach the extended position without aligning with the idler gear 70, the lock extended relay 128cr of line 211 will enter the high logic state. In addition, since the arm assembly 80 is in the extended position, the retracted position relay (relays 110cr and 111cr) will enter the low logic level. As a result, the retracting solenoid of the extending jack 90 will be energized at approximately the same time that the extending solenoid is deenergized and the arm assembly 80 will move towards the retracted position. As explained above, once the lock extended relay 128cr enters the high logic state, it will remain in that state regardless of further movements of the arm assembly 80. Consequently, unless the arm assembly 80 and the idler gear 70 align when the arm assembly 80 is retracted thereby changing the logic state of the lock in engage relay 131cr, the retracting solenoid will be energized and the arm assembly 80 will be retracted until the retracted position detector 130 senses the arm assembly 80 in the retracted position (i.e. relays 110cr and 111cr enter the high logic state). It will, therefore, be appreciated by those skilled in the art that the control circuit of the gear train locking mechanism 50 will return the arm assembly 80 to the home position whenever the rack 96 and the idler gear 70 fail to align. It will be further appreciated that, if the arm assembly 80 and the idler gear 70 fail to align in the first pass (i.e., as the arm assembly 80 moves to the extended position), they will have a second opportunity to align as the arm assembly 80 moves towards the retracted position. If neither pass produces an alignment, the arm assembly 80 is returned to the home position for a possible retry.

Assuming that the arm assembly 80 has been properly extended (i.e. the extending solenoid moved the assembly 80 towards the extended position until the rack 96 and the idler gear 70 aligned at which point it was deenergized in accordance with the logic instructions of line 209 of FIG. 10C), the engaging solenoid of the engaging jack 92 will now be energized. As illustrated in line 215 of FIG. 10C, the engaging solenoid will be energized whenever the lock initiate relay 126cr and the lock in engage relay 131cr are in the high logic state and the engaged position relay (relays 112cr and 113cr) is in the low logic state. As noted above, the lock in engage relay 131cr will achieve the high logic level when the arm assembly 80 and the idler gear 70 are aligned for enmeshment. Thus, once the idler gear 70 and the arm assembly 80 have been aligned, the engaging solenoid will be fired until the arm assembly 80 and the idler gear 70 are engaged (i.e. the arm assembly 80 is in the engaged position).

It will be appreciated by those skilled in the art that the parallel connection of the two relays comprising the engaged position relay (i.e. relays 112cr and 113cr) between junctions 2151 and 2152 on line 215 insures that the engaging solenoid will be fired and the arm assembly 80 moved to the extended position even if one of the paired relays (relays 112cr and 113cr) malfunction during operation. However, it will also be appreciated that once the locking mechanism 50 is returned to the unlock position, the lock safe relay 120cr will not enter the high logic state until after the defective relay is replaced. As a result, once the locking mechanism 50 is returned to the unlocked position, it will not again translate to the locked position until the defective relay is replaced.

Turning now to lines 203–205 of FIG. 10C, it can be seen that the disengaging solenoid of the engaging jack 92 will be energized whenever the lock initiate relay 126cr enters the high logic state, the disengaged position relay (relays 114cr and 115cr) enters the low logic condition (indicating that the arm assembly 80 is not being detected by the disengaged position detector 134 in the disengaged position), and the lock in engage relay 131cr enters the low logic level (indicating that the arm assembly 80 and the idler gear 70 are not aligned). Thus, the disengaging solenoid will always be fired and the arm assembly 80 will always be returned to the disengaged position when the idler gear 70 and the arm assembly 80 are not aligned and the arm assembly 80 has left the disengaged position. Accordingly, the control circuit biases the arm assembly 80 towards the disengaged position to prevent an inadvertent engagement of the rack 96 and the idler gear 70. This bias is important because, if such an inadvertent engagement were to occur while the press was cycling, both the locking mechanism 50 and the press 10 would likely suffer significant damage. By biasing the arm assembly 80 towards the disengaged position, the gear train locking mechanism 50 makes such an inadvertent engagement extremely unlikely.

When operating personnel wish to unlock the serviced power press 10 for operation, they will throw the two operating switches back to the unlock position. As explained above, placing the operating switches in the unlock position causes the disengage/retract relay 122cr to have a high logic state and the extend/engage relay 123cr to have the low logic state. Turning to line 207 of FIG. 10C, it can be seen that when the disengage/retract relay 122cr and the extend/ engage relay 123cr have these logic states, the disengaging solenoid of the engaging jack 92 will be energized until the arm assembly 80 enters the disengaged position (i.e. until the disengaged position detector 134 senses the arm assembly 80 in the disengaged position thereby transitioning the disengaged position relay (relays 114cr and 115cr) to the high logic state).

Turning to line 213 of FIG. 10C, it can be seen that as soon as the arm assembly 80 enters the disengaged position (i.e. the disengaged position relay (relays 114cr and 115cr) enters the high logic state), the retracting solenoid will be energized until the arm assembly 80 reaches the retracted position (i.e. either of the relays 110cr and 111cr comprising the retracted position relay are driven to the high logic condition by their corresponding detectors). Thus, by throwing the operating switches to the unlock position, operating personnel will cause the arm assembly 80 to first move to the disengaged position and then to the retracted position.

Those skilled in the art will appreciate that the parallel connection of the two relays forming the retracted position relay (i.e. relays 110cr and 111cr) between junctions 2111 and 2112 of line 211 insures that the retracting solenoid will be fired even if one of the two relays malfunctions during operation. Thus, even if either relay 110cr or relay 111cr malfunctions after the arm assembly 80 has extended (i.e. after the lock safe relay 120cr has toggled the lock initiate relay 126cr to the high condition), the lock retract solenoid can still be fired by throwing both operating switches to the unlock position. However, it will again be appreciated by those skilled in the art that, once the locking mechanism is returned to the unlocked position, the lock safe relay 120cr will prevent the locking mechanism 50 from being translated to the locked position until the defective relay is replaced.

In order to provide operating personnel with information concerning the state of the gear train locking mechanism 50, the control circuit preferably includes multiple indicating lights and an electrically actuated mechanical flag. As illustrated in lines 219–231 of FIG. 10D, the indicator lights and flag will be actuated to indicated whether the locking mechanism 50 is in the locked or the unlocked position. To this end, the lights and flag indicating that the gear train locking mechanism 50 is locked and the serviced press 10 can be safely approached will be actuated whenever the lock in engage relay 131cr and the engaged position relay (relays 112cr and 113cr) both have the high logic state. Similarly, the lights and flag indicating that the locking mechanism 50 is unlocked will be actuated whenever the disengage/retract relay 122cr, the retracted position relay (relays 110cr and 111cr), and the disengaged position relay (relays 114cr and 115cr) have the high logic state, and the extend/engage relay 123cr has the low logic state.

Figure 10E:
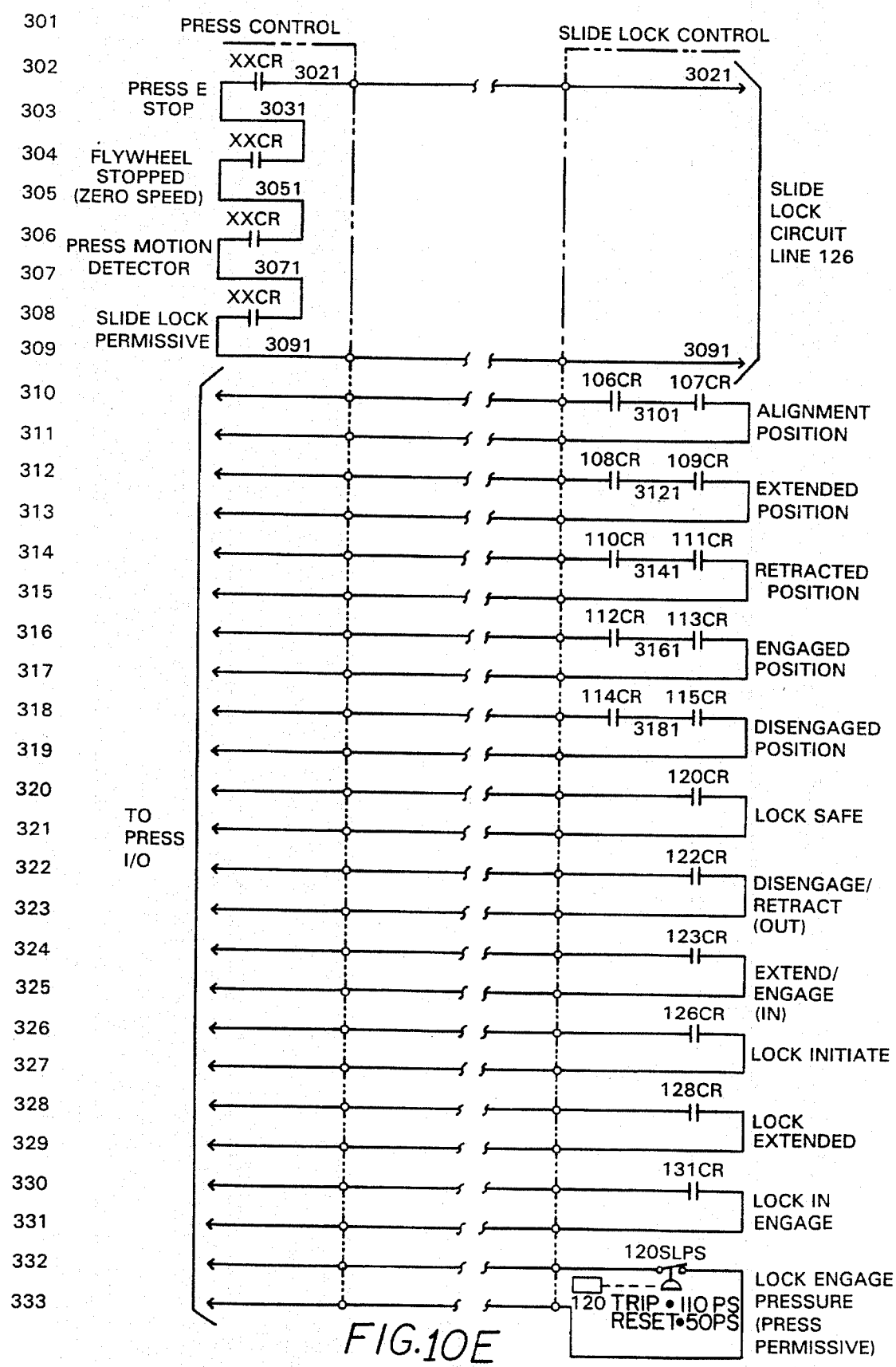
FIG. 10E is a circuit diagram illustrating the final portion of the preferred control circuit.

It should be noted that in the preferred embodiment, the control circuit of the locking mechanism 50 is further provided with the diagnostics circuitry illustrated in lines 310–333 of FIG. 10E. Typically, the serviced power press 10 will include a programmable logic controller (PLC) for performing system diagnostics. The control circuit of the locking mechanism 50 is, thus, equipped with circuitry that a user can connect to the input card module of the press PLC to quickly locate a malfunctioning relay or proximity detector. It should further be noted that the circuitry illustrated by lines 302–308 of FIG. 10E indicates the preferred manner of wiring the press control interface of FIG. 10B.

Figure 11:
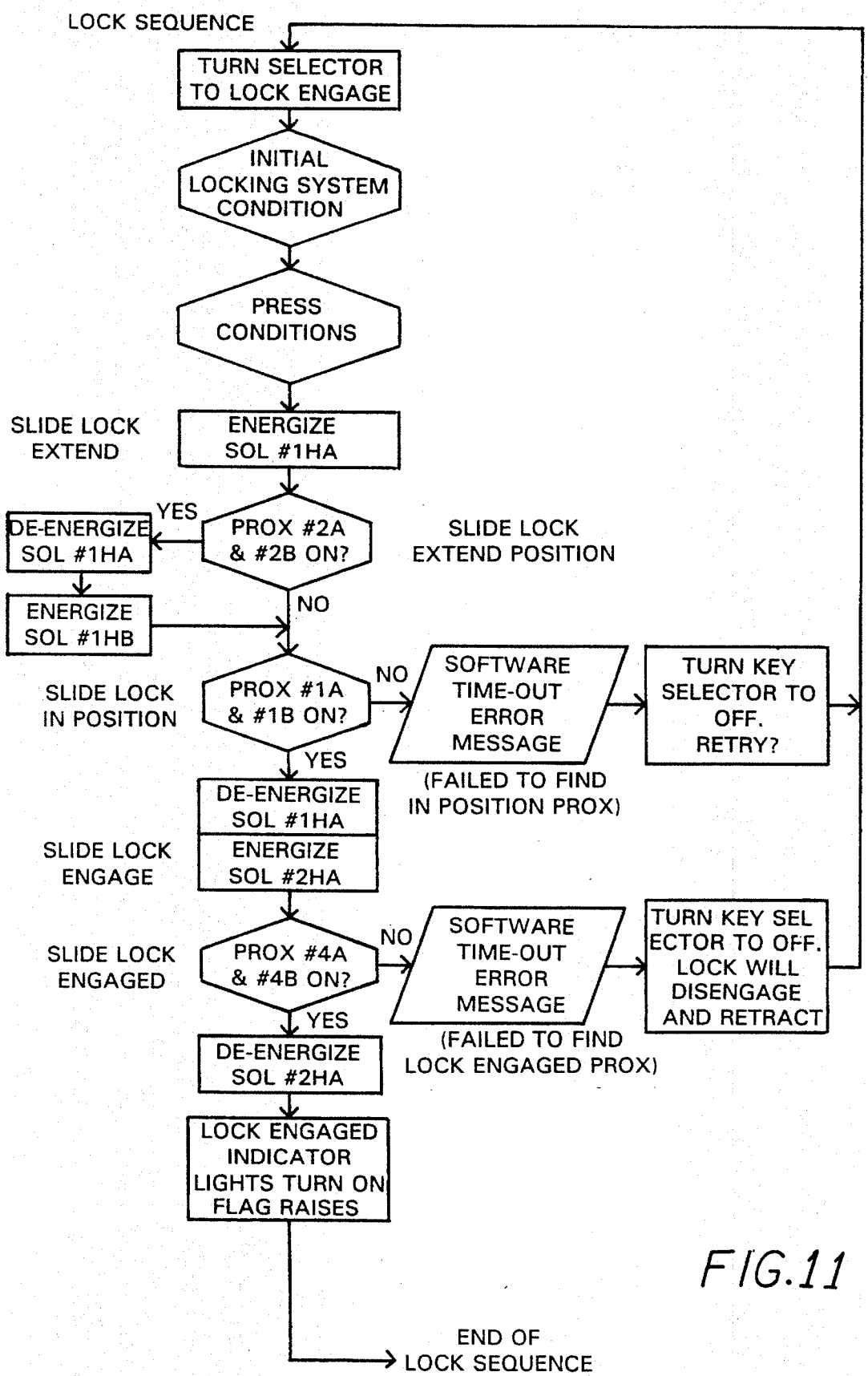
FIG. 11 is a flow chart illustrating the lock sequence of the gear train locking mechanism.
Figure 12:
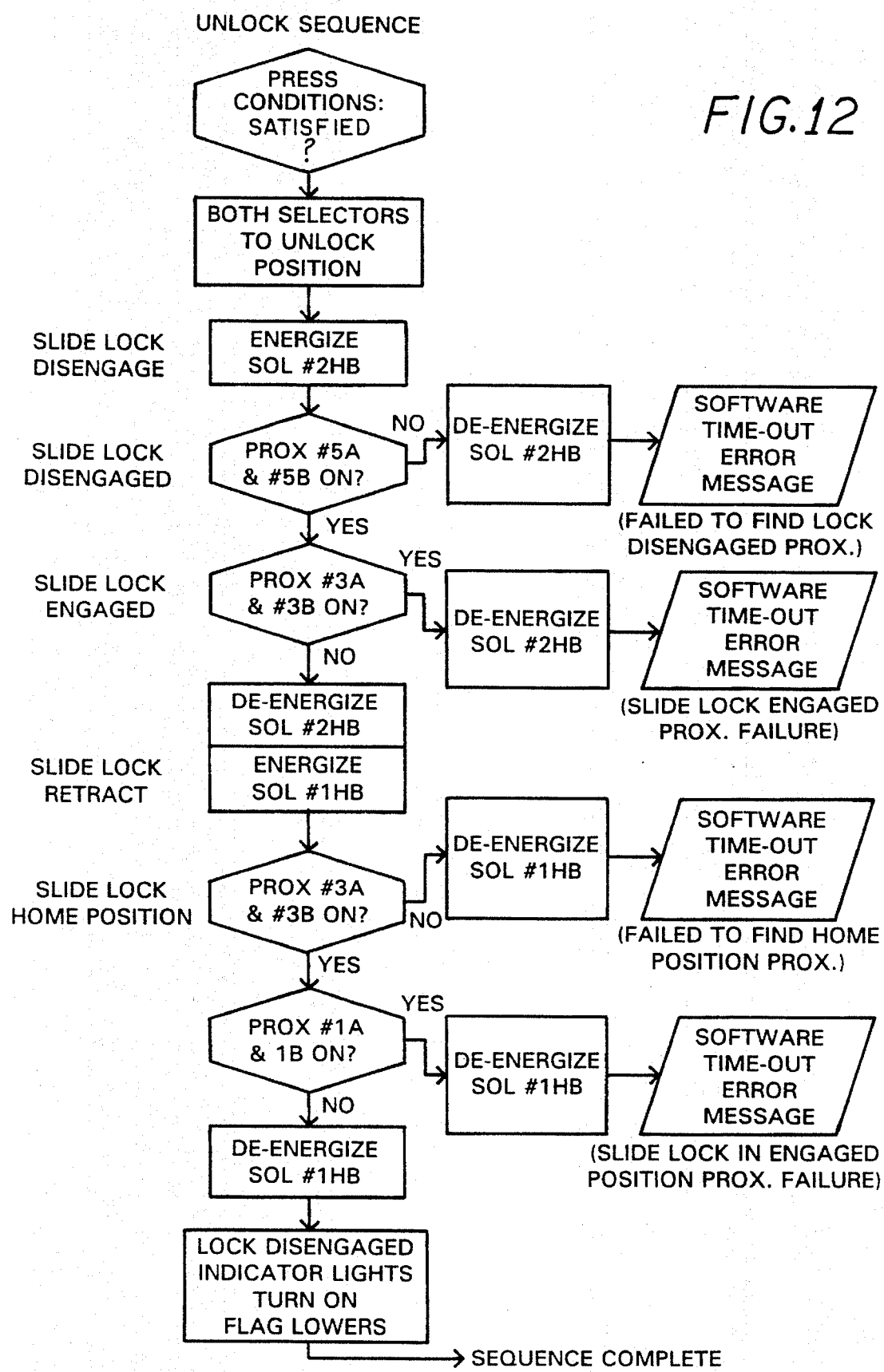
FIG. 12 is a flow chart illustrating the unlock sequence of the gear train locking mechanism.
Figure 13:
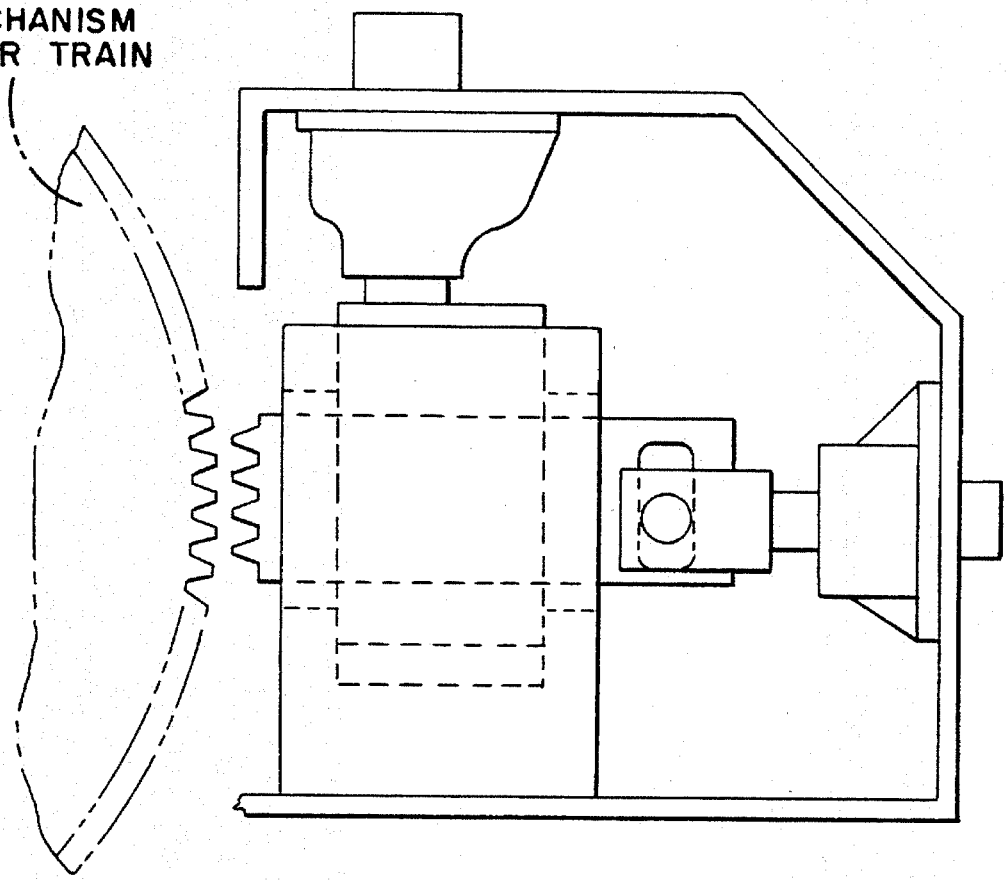
FIG. 13 is a front, cut away view of a prior art locking mechanism.

As an aid to understanding the foregoing description of the preferred embodiment of the locking mechanism's control system, the lock and unlock sequences performed by the control system have been diagrammatically illustrated in FIGS. 11 and 12. It should be noted that the following symbols have been employed in FIGS. 11 and 12:

| FIGS. 11 & 12 | Equivalent Structure |
| --- | --- |
| Prox #1A & #1B | Alignment detector |
| Prox #2A & #2B | Extended position detector |
| Prox #3A & #3B | Retracted position detector |
| Prox #4A & #4B | Engaged position detector |
| Prox #5A & #5B | Disengaged position detector |
| Sol #1HA | Extending solenoid |
| Sol #1HB | Retracting solenoid |
| Sol #2HA | Engaging solenoid |
| Sol #2HB | Disengaging solenoid |

As illustrated in FIG. 11, the lock sequence is initiated when the user turns the selector or operating switch to the lock position. The control system then determines whether the initial locking mechanism conditions, such as the arm assembly 80 being disposed in the home position, are met. Next the control system determines whether various press conditions have been met. To meet these conditions the main motor of the press must have stopped moving and its flywheel 19 must have stopped. Once these conditions are met, the control system energizes the extending solenoid (Sol #1HA) of the extending jack 92. The arm assembly 80 is then moved towards the extended position. If the alignment position detector 138 (Prox #1A & #1B) detects the alignment of the arm assembly 80 and the idler gear 70, the extending solenoid (Sol #1HA) is deenergized. However, if the extended position detector 132 (Prox #2A & #2B) senses the arm assembly 80 in the extended position without such an alignment ever occurring, the extending solenoid (Sol #1HA) is deenergized and the retracting solenoid (Sol #1HB) of the extending jack 92 is energized such that the arm assembly 80 moves back towards the retracted position. If the alignment detector 138 (Prox #1A & #1B) still does not sense an alignment between the idler gear 70 and the arm assembly 80, an error message is generated for the user and the arm assembly 80 is returned to the home position for a possible retry. If, the arm assembly 80 and the idler gear 70 align, the retracting solenoid (Sol #1HA) is deenergized.

Once the arm assembly 80 and the idler gear 70 are aligned, the engaging solenoid (Sol #2HA) of the engaging jack 92 is energized. If the engaged position detector 136 (Prox #4A & #4B) indicates that the arm assembly 80 and the idler gear 70 have enmeshed, the engaging solenoid (Sol # 2HA) is deenergized and the lock engaged indicator lights and flag are actuated. If the engaged position detector 136 (Prox #4a & #4B) does not indicate enmeshment has occurred, an error message is sent to the user and the arm assembly 80 returns to the home position for a possible retry.

Turning now to the unlock sequence illustrated in FIG. 12, it can be seen that, if the operator throws both selectors or operating switches to the unlock position, the control system will energize the disengaging solenoid (Sol #2HB) of the engaging jack 92. If the arm assembly 80 enters the disengaged position (i.e. the disengaged position detector 134 (Prox #5A & #5B) is on), the disengaging solenoid (Sol #2HB) is deenergized. If the arm assembly 80 does not enter the disengaged position, the control system generates an error message.

Once the arm assembly 80 enters the disengaged position, the control system checks whether the retracted position detector 130 (Prox #3A & 3B) is on. If it is on, the system generates an error message. If it is not on, the system energizes the retracting solenoid (Sol #1HB) of the retracting jack 90. The control system then checks both the retracted position detector 130 (Prox #3A & #3B) and the alignment detector 138 (Prox #1A & #1B). If the retracted position detector 130 (Prox #3A & #3B) does not detect the presence of the arm assembly 80 or the alignment detector 138 (Prox #1A & #1B) detects that the idler gear 70 and the arm assembly 80 are aligned, an error message is sent to the user. Otherwise, the retracting solenoid (Sol #1HB) is deenergized and the lock disengaged indicator lights and flag are actuated to indicate that the press 10 is unlocked.

Although the preferred embodiment of the gear train locking mechanism 50 employs relay technology to implement its preferred control circuit, it will be appreciated by those skilled in the art that a microprocessor based control system constructed from solid state components employing digital or analog technology could be use to implement the control system without departing from the scope or spirit of the invention. Similarly, although the preferred embodiment of the locking mechanism 50 employs a hard wired control system, those skilled in the art will readily appreciated that programmable logic controllers (PLC) such as the Mitsubishi Type FX030 PLC or the Omron Type CK28 PLC could be used in place of the preferred hard wired approach without departing from the scope or spirit of the invention. Finally, although the preferred embodiment of the control circuit employs relays sold by Allen-Bradley of Milwaukee, Wis. under the trade name 700-P Relays, it will be appreciated by those skilled in the art that many commercially available relays might likewise be appropriate.

In summary, it will be appreciated by those skilled in the art that the present invention provides a gear train locking mechanism 50 that improves the safety of mechanical power presses and the like by preventing the reciprocating slide 17 of a serviced power press 10 from inadvertently moving during maintenance procedures and the like.

What is claimed is:

1. For use in a power press having a gear train including at least one drive gear, a gear train locking mechanism for securing the at least one drive gear of the power press in a locked position, the gear train locking mechanism comprising, in combination:

an idler gear enmeshed with the at least one drive gear of the power press for rotation therewith;

a movable arm assembly including gear engaging means positioned for selectively engaging the idler gear; and, a first jack for translating the gear engaging means of the movable arm assembly into engagement with the idler gear to prevent rotation of the idler gear and the at least one drive gear.

2. A gear train locking mechanism as defined in claim 1 wherein the gear engaging means of the movable arm assembly comprises a movable rack translatable in a first plane for engaging the idler gear.

3. A gear train locking mechanism as defined in claim 1 wherein the gear engaging means of the movable arm assembly comprises a movable rack translatable in a first plane for engaging the idler gear, and the movable arm assembly includes a block guide defining an opening for slidably receiving and supporting the movable rack.

4. A gear train locking mechanism as defined in claim 3 further comprising a second jack for translating the block guide of the movable arm assembly in a second plane between a home position and an extended position, the first jack translating the movable rack of the movable arm assembly in the first plane between a disengaged position and an engaged position.

5. A gear train locking mechanism as defined in claim 4 further comprising a first detector positioned for sensing the movable arm assembly in the home position, a second detector positioned for sensing the movable arm assembly in the extended position, a third detector positioned for sensing the movable arm assembly in the disengaged position and a fourth detector positioned for sensing the movable arm assembly in the engaged position.

6. A gear train locking mechanism as defined in claim 1 wherein the idler gear and the gear engaging means of the movable arm assembly include teeth, and the gear engaging means of the movable arm assembly includes a position detector for sensing when the teeth of the idler gear are aligned with the teeth of the gear engaging means of the arm assembly.

7. A gear train locking mechanism as defined in claim 1 further comprising a control system for controlling the movement of the movable arm assembly.

8. A gear train locking mechanism as defined in claim 7 wherein the control system further comprises a control circuit and a plurality of detectors for detecting the position of the movable arm assembly, the plurality of detectors being electrically connected to the control circuit to provide feedback signals thereto for controlling the movement of the movable arm assembly.

9. For use in a power press having a gear train including at least one drive gear, a gear train locking mechanism for selectively preventing the power press from cycling comprising, in combination:

a housing;

an arm assembly supported within the housing by a first jack and a second jack, the arm assembly including gear engaging means, the first jack translating the arm assembly in a first plane between a home position and an extended position, the second jack translating the gear engaging means of the arm assembly in a second plane between a disengaged position and an engaged position; and, an idler gear engaging the at least one drive gear of the power press, the first and second jacks selectively translating the gear engaging means of the arm assembly into operative engagement with the idler gear to prevent the at least one drive gear of the power press from rotating.

10. A gear train locking mechanism as defined in claim 9 wherein the gear engaging means of the arm assembly comprises a movable rack coupled to the first jack for translation between the engaged and disengaged positions, and the arm assembly includes a block guide coupled to the second jack for translating between the retracted and extended positions, the block guide defining an opening for slidably receiving the movable rack.

11. A gear train locking mechanism as defined in claim 10 wherein the movable rack is coupled to the first jack with a clevis permitting the movable rack to translate with the block guide.

12. A gear train locking mechanism as defined in claim 9 further comprising a control system for controlling the movement of the arm assembly.

13. A gear train locking mechanism as defined in claim 12 wherein the control system comprises a plurality of proximity detectors for sensing the position of the arm assembly and a control circuit for controlling the movement of the arm assembly.

14. A gear train locking mechanism as defined in claim 13 wherein the proximity detectors are redundantly wired.

15. A gear train locking mechanism as defined in claim 13 wherein the control circuit comprises a hard wired relay panel remotely mounted on the power press.

16. A gear train locking mechanism for use in a power press having a reciprocating slide for performing operations on a workpiece disposed within a work area, and a gear train having a drive gear for driving the reciprocating slide through a workcycle, the gear train locking mechanism comprising:

- an arm assembly supported by an extending jack and an engaging jack, the extending jack translating the arm assembly in a first plane between a retracted position and an extended position, the engaging jack translating the arm assembly in a second plane between a disengaged position and an engaged position,
- an idler gear enmeshed with the drive gear of the power press, and,
- a control system for monitoring the position of the arm assembly and for providing the extending and engaging jacks with control signals to selectively translate the arm assembly into engagement with the idler gear to prevent the drive gear of the power press from rotating and the reciprocating slide from cycling.

17. A gear train locking mechanism as defined in claim 16 wherein the arm assembly comprises a movable rack coupled to the engaging jack for translation between the engaged and disengaged positions and a block guide coupled to the extending jack for translating between the retracted and extended positions, the block guide defining an opening for slidably receiving the movable rack.

18. A gear train locking mechanism as defined in claim 17 wherein the movable rack is coupled to the engaging jack with a clevis permitting the movable rack to translate with the block guide.

19. A gear train locking mechanism as defined in claim 16 wherein the control system comprises a plurality of proximity detectors for sensing the position of the arm assembly and a control circuit for controlling the movement of the arm assembly.

* * * * *